(12) United States Patent
Jeung

(10) Patent No.: US 8,287,244 B2
(45) Date of Patent: Oct. 16, 2012

(54) MOTOR CONTROL APPARATUS FOR A VENTILATION SYSTEM

(75) Inventor: Young-Chun Jeung, Cypress, CA (US)

(73) Assignee: Sntech, Inc., Phoenix, AZ (US)

( * ) Notice: Subject to any disclaimer, the term of this patent is extended or adjusted under 35 U.S.C. 154(b) by 1231 days.

(21) Appl. No.: 12/016,850

(22) Filed: Jan. 18, 2008

(65) Prior Publication Data

US 2009/0136359 A1 May 28, 2009

(30) Foreign Application Priority Data

Nov. 28, 2007 (KR) .......................... 10-2007-0122264

(51) Int. Cl.
*F04B 49/00* (2006.01)
*F04B 49/06* (2006.01)

(52) U.S. Cl. ............ 417/20; 417/42; 318/432; 318/434; 318/644; 388/929

(58) Field of Classification Search ...................... 417/20, 417/22, 42, 43, 44.1; 318/432, 434, 644; 388/929

See application file for complete search history.

(56) References Cited

U.S. PATENT DOCUMENTS

| | | |
|---|---|---|
| 2,650,336 A | 8/1953 | Noodleman |
| 3,299,335 A | 1/1967 | Wessels |
| 3,444,406 A | 5/1969 | Aha |
| 3,457,486 A | 7/1969 | Soeda |
| 3,531,702 A | 9/1970 | Hill |
| 3,604,960 A | 9/1971 | Krestel |
| 3,787,014 A | 1/1974 | Story et al. |
| 3,878,809 A | 4/1975 | Ray |
| 4,004,202 A | 1/1977 | Davis |
| 4,271,385 A | 6/1981 | Azusawa |
| 4,384,224 A | 5/1983 | Spitler et al. |
| 4,389,606 A | 6/1983 | Detering |
| 4,528,898 A | 7/1985 | Sharp et al. |
| 4,544,856 A | 10/1985 | King |

(Continued)

FOREIGN PATENT DOCUMENTS

JP 03248248 B2 1/2002

(Continued)

OTHER PUBLICATIONS

Notice of Allowance dated Jan. 29, 2010 of priority application KR 10-2007-0122264—1 pg.

(Continued)

*Primary Examiner* — Devon Kramer
*Assistant Examiner* — Thomas Fink
(74) *Attorney, Agent, or Firm* — Knobbe Martens Olson & Bear

(57) ABSTRACT

A method of constant airflow control includes various controls to accomplish a substantially constant airflow rate over a significant change of the static pressure in a ventilation duct. One control is a constant I·RPM control, which is primarily used in a low static pressure range. Another control is a constant RPM control, which is primarily used in a high static pressure range. These controls requires neither a static pressure sensor nor an airflow rate sensor to accomplish substantially constant airflow rate while static pressure changes. Also, the method improves the accuracy of the control by correcting certain deviations that are caused by the motor's current-RPM characteristics. To compensate the deviation, the method adopts a test operation in a minimum static pressure condition. Also disclosed is an apparatus for conducting these control methods.

8 Claims, 17 Drawing Sheets

U.S. PATENT DOCUMENTS

| | | | |
|---|---|---|---|
| 4,638,233 A | | 1/1987 | Erdman |
| 4,642,885 A | | 2/1987 | King |
| 4,668,898 A | | 5/1987 | Harms et al. |
| 4,712,030 A | | 12/1987 | Lakin et al. |
| 4,774,448 A | | 9/1988 | Yoshitomi |
| 4,786,295 A | | 11/1988 | Newman et al. |
| 4,806,833 A | | 2/1989 | Young |
| 4,880,474 A | | 11/1989 | Koharagi et al. |
| 4,888,530 A | | 12/1989 | Radik et al. |
| 4,978,896 A | * | 12/1990 | Shah ............... 318/400.08 |
| 5,019,757 A | * | 5/1991 | Beifus ............... 318/400.07 |
| 5,170,673 A | | 12/1992 | Ahmed et al. |
| 5,243,732 A | | 9/1993 | Koharagi et al. |
| 5,447,414 A | | 9/1995 | Nordby et al. |
| 5,492,273 A | | 2/1996 | Shah |
| 5,559,407 A | | 9/1996 | Dudley et al. |
| 5,592,058 A | | 1/1997 | Archer et al. |
| 5,653,386 A | | 8/1997 | Hennessee et al. |
| 5,663,616 A | | 9/1997 | Stringfellow et al. |
| 5,680,021 A | | 10/1997 | Hollenbeck |
| 5,736,823 A | | 4/1998 | Nordby et al. |
| 5,739,614 A | | 4/1998 | Suzuki et al. |
| 5,767,635 A | | 6/1998 | Steffens et al. |
| 5,818,194 A | | 10/1998 | Nordby |
| 6,209,622 B1 | | 4/2001 | Lagace et al. |
| 6,255,792 B1 | | 7/2001 | Grasso et al. |
| 6,310,452 B1 | | 10/2001 | Deck et al. |
| 6,353,299 B1 | | 3/2002 | Ramachandran et al. |
| 6,369,536 B2 | * | 4/2002 | Beifus et al. ............... 318/400.12 |
| 6,462,494 B1 | | 10/2002 | Schone et al. |
| 6,504,338 B1 | | 1/2003 | Eichorn |
| RE38,406 E | | 1/2004 | Faris et al. |
| 6,771,032 B2 | * | 8/2004 | Cox-Smith et al. ............... 318/85 |
| 6,801,013 B2 | | 10/2004 | Woodward et al. |
| 6,864,657 B1 | | 3/2005 | Lungu |
| 6,924,611 B1 | | 8/2005 | Tzeng et al. |
| 6,952,088 B2 | | 10/2005 | Woodward et al. |
| 7,015,663 B1 | | 3/2006 | Tzeng et al. |
| 7,042,180 B2 | | 5/2006 | Terry et al. |
| 7,131,398 B2 | | 11/2006 | Cohen et al. |
| 7,244,106 B2 | | 7/2007 | Kallman et al. |
| 7,268,505 B2 | | 9/2007 | Pant et al. |
| 7,272,302 B2 | | 9/2007 | Woodward et al. |
| 7,296,753 B1 | | 11/2007 | Zucker |
| 7,327,118 B2 | | 2/2008 | Pant et al. |
| 7,347,112 B2 | | 3/2008 | Kay |
| 7,378,821 B2 | | 5/2008 | Simpson, III |
| 7,443,119 B2 | | 10/2008 | Liu |
| 7,458,228 B2 | | 12/2008 | Lagace et al. |
| 7,573,217 B2 | | 8/2009 | Solan et al. |
| 7,590,334 B2 | | 9/2009 | Yabusaki et al. |
| 7,657,161 B2 | | 2/2010 | Jeung |
| 7,831,338 B1 | | 11/2010 | Haydu |
| 7,880,421 B2 | * | 2/2011 | Karwath ............... 318/644 |
| 2002/0047348 A1 | | 4/2002 | Ohiwa et al. |
| 2003/0001442 A1 | | 1/2003 | Hsu |
| 2003/0015982 A1 | * | 1/2003 | Cox-Smith et al. ............ 318/433 |
| 2003/0042860 A1 | | 3/2003 | Sulfstede |
| 2003/0080772 A1 | | 5/2003 | Giacomini et al. |
| 2003/0130815 A1 | | 7/2003 | Cohen et al. |
| 2003/0173924 A1 | | 9/2003 | Blase et al. |
| 2004/0232871 A1 | | 11/2004 | Deck et al. |
| 2005/0029976 A1 | | 2/2005 | Terry et al. |
| 2005/0162108 A1 | | 7/2005 | Pant et al. |
| 2005/0253744 A1 | | 11/2005 | Kern |
| 2006/0099084 A1 | | 5/2006 | Otaki et al. |
| 2006/0290304 A1 | | 12/2006 | Marcinkiewicz et al. |
| 2006/0291820 A1 | | 12/2006 | Kobayashi |
| 2007/0024250 A1 | | 2/2007 | Simpson, III |
| 2007/0170880 A1 | | 7/2007 | Shahi et al. |
| 2007/0247091 A1 | | 10/2007 | Maiocchi |
| 2008/0084171 A1 | | 4/2008 | Leehey et al. |
| 2008/0188173 A1 | | 8/2008 | Chen et al. |
| 2009/0039807 A1 | | 2/2009 | Yabusaki et al. |
| 2009/0039820 A1 | | 2/2009 | Milano et al. |
| 2009/0134823 A1 | | 5/2009 | Jeung |
| 2009/0134827 A1 | | 5/2009 | Jeung |
| 2009/0136360 A1 | | 5/2009 | Jeung |
| 2009/0137199 A1 | | 5/2009 | Jeung |
| 2009/0218968 A1 | | 9/2009 | Jeung |
| 2009/0218971 A1 | | 9/2009 | Jeung |
| 2009/0224709 A1 | | 9/2009 | Jeung |
| 2009/0267549 A1 | | 10/2009 | Kitagawa |
| 2009/0284201 A1 | | 11/2009 | Jeung |
| 2009/0315494 A1 | | 12/2009 | Jeung et al. |
| 2009/0315496 A1 | | 12/2009 | Jeung et al. |
| 2009/0315497 A1 | | 12/2009 | Jeung et al. |
| 2009/0315498 A1 | | 12/2009 | Jeung et al. |
| 2010/0039055 A1 | | 2/2010 | Jeung |
| 2010/0039058 A1 | | 2/2010 | Jeung |
| 2010/0041327 A1 | | 2/2010 | Desler |
| 2010/0068070 A1 | | 3/2010 | Shahi et al. |
| 2010/0102136 A1 | | 4/2010 | Hadzidedic et al. |
| 2010/0106318 A1 | | 4/2010 | Grohman et al. |

FOREIGN PATENT DOCUMENTS

| | | |
|---|---|---|
| JP | 2004-023823 A | 1/2004 |
| JP | 2004-56887 A | 2/2004 |
| JP | 2004-304928 A | 10/2004 |
| JP | 2005-168241 A | 6/2005 |
| KR | 10-2006-0115930 A | 11/2006 |
| KR | 10-0696854 B1 | 3/2007 |
| WO | 2009-111503 A2 | 9/2009 |
| WO | 2009-140419 A2 | 11/2009 |
| WO | 2009-158359 A2 | 12/2009 |

OTHER PUBLICATIONS

Notice of Allowance received in U.S. Appl. No. 12/016,894 dated Dec. 8, 2009.

* cited by examiner

MOTOR CONTROL APPARATUS FOR A VENTILATION SYSTEM

CROSS-REFERENCE TO RELATED APPLICATION

This application is related to the concurrently filed applications listed below, the contents of which are incorporated herein by reference in their entirety.

| Application No. | Filing Date | Title |
| --- | --- | --- |
| 12/016,924 | Jan. 18, 2008 | METHOD OF CONSTANT AIRFLOW CONTROL FOR A VENTILATION SYSTEM |
| 12/016,849 | Jan. 18, 2008 | METHOD OF CONSTANT RPM CONTROL FOR A VENTILATION SYSTEM |
| 12/016,894 | Jan. 18, 2008 | METHOD OF TRANSITION BETWEEN CONTROLS FOR A VENTILATION SYSTEM |
| 12/016,872 | Jan. 18, 2008 | MULTI-LEVEL PROGRAMMING OF MOTOR FOR A VENTILATION SYSTEM |
| 12/016,878 | Jan. 18, 2008 | COMPENSATION OF MOTOR CONTROL USING CURRENT-RPM RELATION FOR A VENTILATION SYSTEM |

BACKGROUND

The present disclosure relates to airflow control, and more particularly, to control of an electric motor for a substantially constant airflow.

Discussion of Related Technology

A typical ventilation system includes a fan blowing air and a ventilation duct to guide the air from the fan to a room or space to air condition. An electric motor is coupled to the fan and rotates the fan. Certain ventilation systems also include a controller or control circuit for controlling operation of the electric motor for adjusting the rotational speed of the motor. The controller may change the electric current supplied to the electric motor to adjust the rotational speed. In certain ventilation systems, the controller controls the operation of the motor to adjust the air flow rate, which is the volume of the air flowing through the duct for a given time period.

SUMMARY

One aspect of the invention provides a method of operating an electric motor in a ventilation system. The method may comprise: detecting an electric current applied to a motor; detecting a rotational speed of the motor; and controlling the motor's operation to adjust a product of the electric current and the rotational speed so as to arrive a target value. In the foregoing method, the motor is coupled with a fan, which blows air in a ventilation duct, wherein controlling the motor's operation may generate an airflow with a substantially constant airflow rate in the ventilation duct in a range of a static pressure within the duct. The system may not comprise an airflow rate sensor for detecting an airflow rate generated by the blower, wherein controlling the motor's operation does not use an input of an airflow rate change. Controlling the motor's operation may generate the substantially constant airflow rate while the static pressure significantly changes. The system may not comprise a static pressure sensor for detecting the static pressure within the duct, wherein controlling the motor's operation does not use an input of a static pressure change.

Still in the foregoing method, controlling the motor's operation may comprise adjusting a turn-on period of the motor so as to attempt to make the product reach the target value. The target value may be computed using a rated electric current and a rated rotational speed of the motor. The target value may be a fractional value of a product of a rated electric current and a rated rotational speed of the motor. The method may further comprise: receiving a user input of a desired level of airflow rate; and obtaining the target value that corresponds to the desired level. Receiving the user input may comprise receiving a user's selection among a plurality of predetermined levels, and wherein obtaining the target value may comprise retrieving the target value from a plurality of values stored in a memory, wherein the retrieved target value may be associated with the user's selection. Receiving the user input may comprise receiving a user's desired level represented in a number, and wherein obtaining the target value may comprise computing the target value using the number and a preprogrammed formula.

Still in the foregoing method, controlling the motor's operation may comprise transitioning from adjusting the product to adjusting a rotational speed of the motor to arrive another target value. Controlling the motor's operation may comprise transitioning to adjusting the product from adjusting a rotational speed of the motor to arrive another target value. The method may further comprise: determining whether the electric current is greater or smaller than a reference value; and when the electric current is greater than the reference value, continuing to control the motor's operation so as to adjusting the product. The method may further comprise: determining whether the electric current is greater or smaller than a reference value; and when the electric current becomes smaller than the reference value, controlling the motor's operation so as to transition from adjusting the product to adjusting a rotational speed of the motor to arrive another target value.

Another aspect of the invention provides a method of operating an electric motor in a ventilation system. The method comprises: providing a blower comprising a motor and a fan coupled to the motor, the blower being configured to generate an airflow in a ventilation duct; detecting an electric current applied to the motor; detecting a rotational speed of the motor; and controlling the motor's operation so as to generate the airflow with a substantially constant airflow while a static pressure within the duct substantially changes, wherein controlling the motor's operation does not use an input of a static pressure within the duct.

In the foregoing method, the system may not comprise a static pressure sensor for detecting a static pressure within the duct. The system may not comprise an airflow rate sensor for detecting an airflow rate generated by the blower, wherein controlling the motor's operation does not use an input of an airflow rate generated by the blower. Controlling the motor's operation may comprise conducting a feedback control of a product of the electric current and the rotational speed so as to make the product reach a target value. Controlling the motor's operation may comprise conducting a feedback control of the rotational speed so as to make the rotational speed reach a target value. Controlling the motor's operation may comprise conducting a feedback control of a product of the electric current and the rotational speed so as to make the product reach a target value.

The method may further comprise determining whether the electric current is greater or smaller than a reference value, wherein the feedback control of the product is performed when the electric current is greater than the reference value. Controlling the motor's operation may comprise a feedback control of the rotational speed so as to make the rotational speed reach a target value. The method may further comprise determining whether the electric current is greater or smaller than a reference value, wherein the feedback control of the rotational speed is performed when the electric current is smaller than the reference value.

Another aspect of the invention provides a method of operating an electric motor in a ventilation system. The method comprises: providing a blower comprising a motor and a fan coupled to the motor, the blower being configured to generate an airflow in a ventilation duct; monitoring a rotational speed of the motor; monitoring an electric current applied to a motor; and controlling the motor's operation so as to maintain the rotational speed within proximity of a target rotational speed while the electric current is smaller than a reference value.

In the foregoing method, controlling the motor's operation may generate a substantially constant airflow rate while a static pressure within the duct significantly changes. The system may not comprise an airflow rate sensor for detecting an airflow rate generated by the blower, wherein controlling the motor's operation does not use an input of an airflow rate generated by the blower. The system may not comprise a static pressure sensor for detecting the static pressure within the duct, wherein controlling the motor's operation does not use an input of a static pressure within the duct. Controlling the motor's operation may comprise adjusting a turn-on period of the motor so as to attempt to make the product reach the target rotational speed. The method may further comprise receiving a user's input of a desired rotational speed, which becomes the target rotational speed. The target rotational speed may be a fractional value of a rated rotational speed of the motor.

The foregoing method may further comprise: receiving a user input of a desired level of the rotational speed, wherein the user input may comprise a selection among a plurality of predetermined levels; and retrieving, from a memory, the target rotational speed associated with the user's selection. The method may further comprise: receiving a user input of a desired level of the rotational speed, wherein the user inputs the desired level represented in a number; and computing the target rotational speed using the number and a preprogrammed formula. The target rotational speed may be computed using the number and a rated rotational speed of the motor. Controlling the motor's operation may comprise transitioning from maintaining the rotational speed to maintaining a product of the electric current and the rotational speed within proximity of another target value. The other target value may be computed using a rated electric current and a rated rotational speed of the motor. Transitioning may occur when the electric current becomes greater than the reference value.

Another aspect of the invention provides a method of operating an electric motor in a ventilation system. The method comprising: providing a blower comprising a motor and a fan coupled to the motor, the blower being configured to generate an airflow in a ventilation duct; detecting an electric current applied to the motor; detecting a rotational speed of the motor; and controlling the motor's operation so as to generate the airflow with a substantially constant airflow while a static pressure within the duct substantially changes, wherein controlling the motor's operation does not use an input of an airflow rate generated by the blower.

The system may not comprise an airflow rate sensor for detecting changes of the airflow rate. The system may not comprise a static pressure sensor for detecting a static pressure within the duct, and wherein controlling the motor's operation does not use an input of a static pressure within the duct. Controlling the motor's operation may comprise a feedback control of the rotational speed so as to make the rotational speed reach a target value. Controlling the motor's operation may comprise a feedback control of a product of the electric current and the rotational speed so as to make the product reach a target value. The method may further comprise determining whether the electric current is greater or smaller than a reference value, wherein the feedback control of the product is performed when the electric current is greater than the reference value. Controlling the motor's operation may comprise a feedback control of the rotational speed so as to make the rotational speed reach a target value. The method may further comprise determining whether the electric current is greater or smaller than a reference value, wherein the feedback control of the rotational speed is performed when the electric current is smaller than the reference value.

Another aspect of the invention provides a method of operating an electric motor in a ventilation system. The method comprising: running a motor in a first control mode, which attempts to make a I·RPM value reach a first target value, wherein the I·RPM value is a product of an electric current and the rotational speed of the motor; running the motor in a second control mode, which attempts to make the rotational speed reach a second target value; and transitioning between the first control mode and the second control mode.

The foregoing method may further comprise: comparing the electric current with a reference value; and wherein transitioning may be carried out based on a result of the comparison. Comparing may be continuously, periodically or sporadically performed during running of the motor. The reference value may be a user's input or a value computed using a user's input for at least one of the first and second control modes. The method may further comprise receiving a user input of a desired level of airflow. The desired level may be a fractional value of a maximum airflow rate, and wherein the reference value may be computed using the fractional value. The reference value may be a product of the fractional value and a rated electric current of the motor. The first target value may not change while running in the first control mode, and wherein the second target value may not change while running in the second control mode. The first control mode may be chosen when the electric current is greater than the reference value. The second control mode may be chosen when the electric current is smaller than the reference value. The motor may run in the first control mode at a first static pressure within a ventilation duct, wherein the motor may run in the second control mode at a second static pressure, which may be greater than the first static pressure.

The foregoing method may further comprise: receiving a user's input of a desired level of airflow, wherein the user selects one of a plurality of predetermined levels of airflow; and retrieving the first target value from a plurality of values stored in a memory of the system, wherein the retrieved first target value may be associated with the user's selection. The method may further comprise: receiving a user's input of a desired level of airflow, wherein the user inputs the desired level represented in a number rather than selecting from pre-programmed choices; and computing the first target value using the number and a preprogrammed formula. The first target value may be computed using a rated electric current and a rated rotational speed of the motor. The method may further comprise receiving a user's input of a desired maximum rotational speed, which becomes the second target value for the second control mode.

The motor may be coupled with a fan, which blows air in a ventilation duct, wherein running the motor in the first control mode may generate an airflow with a substantially constant airflow rate while a static pressure within the duct significantly changes. The motor may be coupled with a fan, which blows air in a ventilation duct, wherein the system may not comprise an airflow rate sensor for detecting an airflow rate generated by the fan, wherein running the motor in the first or second control mode does not use an input of an airflow rate generated by the fan. The motor may be coupled with a fan, which blows air in a ventilation duct, wherein the system may not comprise a static pressure sensor for detecting a static pressure within a ventilation duct, wherein running the motor in the first or second control mode does not use an input of a static pressure within the ventilation duct. Running the motor in at least one of the first and second control nodes may comprise adjusting a turn-on period of the motor so as to make the product reach the first target value. The method may further comprise: monitoring the electric current applied to the motor; and monitoring a rotational speed of the motor.

Another aspect of the invention provides a method of operating an electric motor in a ventilation system. The method comprising: running a motor in a first control mode, which attempts to make a I·RPM value reach a first target value, wherein the I·RPM value may be a product of an electric current and the rotational speed of the motor; monitoring changes of the electric current; comparing the monitored electric current against a reference; and transitioning the motor's operation to a second control mode, which attempts to make the rotational speed reach a second target value, when determining that the electric current changes from a value greater than the reference to a value smaller than the reference.

A further aspect of the invention provides a method of operating an electric motor in a ventilation system. The method comprising: running a motor in a second control mode, which attempts to make a rotational speed of the motor reach a second target value; monitoring changes of the electric current; comparing the monitored electric current against a reference; transitioning the motor's operation to a first control mode, which attempts to make the I·RPM value reach a first target value, when determining that the electric current changes from a value smaller than the reference to a value greater than the reference, wherein the I·RPM value may be a product of an electric current and the rotational speed of the motor.

A further aspect of the invention provides a method of operating an electric motor in a ventilation system. The method comprising: providing a user interface configured to receive a user's input; receiving a user's input of a desired level of airflow rate, wherein the desired level may be a fraction of a maximum airflow rate computed using at least one rated value of the motor; obtaining a target value corresponding to the desired level for a feedback control; and conducting the feedback control using the target value for a substantially constant airflow rate.

In the foregoing method, receiving the user input may comprise receiving a user's selection among a plurality of predetermined levels. Obtaining the target value may comprise retrieving the target value from a plurality of values stored in a memory, wherein the retrieved target value may be associated with the user's selection. The desired level may be a user inputted number rather than a selection among preprogrammed choices. Obtaining the target value may comprise computing the target value using the number and a preprogrammed formula. The feedback control may be to adjust a product of an electric current and a rotational speed so as to make the product stay within proximity of the target value. The feedback control may be conducted when an electric current applied to the motor is greater than a reference value. The reference value may be the same fraction of a rated electric current of the motor. The maximum airflow rate may be a product of a rated electric current and a rated rotational speed.

The method may further comprise: receiving a user's input of a desired level of a rotational speed, which may be a fractional value of a rated rotational speed of the motor; and obtaining a target rotational speed corresponding to the desired level for another feedback control. The method may further comprise conducting the other feedback control using the target rotational speed to make a rotational speed of the motor stay within proximity of the target rotational speed. The other feedback control using the target rotational speed may generate a substantially constant airflow rate. The other feedback control may be conducted when an electric current applied to the motor may be smaller than a reference value.

The user input of a desired level may comprise a selection among a plurality of predetermined levels of rotational speed, and wherein obtaining the target rotational speed may comprise retrieving, from a memory, the target rotational speed associated with the user's selection. The user input of a desired level may comprise a user inputted number rather than a section among preprogrammed levels, and wherein obtaining the target rotational speed may comprise computing the target rotational speed using the number and a preprogrammed formula. The target rotational speed may be computed using the user inputted number and a rated rotational speed of the motor.

A still further aspect of the invention provides a method of operating an electric motor in a ventilation system. The method comprising: providing a user interface configured to receive a user's input; receiving a user's input of a desired level of a rotational speed, which may be a fractional value of a rated rotational speed of the motor; and obtaining a target rotational speed corresponding to the desired level for a feedback control; and conducting the feedback control using the target rotational speed for a substantially constant airflow rate in a range of an electric current, which may be smaller than a reference value.

The method may further comprise receiving a user's input of a desired level of airflow rate, wherein the desired level may be a fraction of a maximum airflow rate computed using at least one rated value of the motor. The reference value may be a product of the fraction and a rated electric current of the motor. Conducting the feedback control using the target rotational speed attempts to make a rotational speed of the motor stay within proximity of the target rotational speed. The user input of a desired level may comprise a selection among a plurality of predetermined levels of rotational speed, and wherein obtaining the target rotational speed may comprise retrieving, from a memory, the target rotational speed associated with the user's selection. The user input of a desired level may comprise a user inputted number rather than a section among preprogrammed levels, and wherein obtaining the target rotational speed may comprise computing the target rotational speed using the number and a preprogrammed formula. The target rotational speed may be computed using the user inputted number and a rated rotational speed of the motor.

A still further aspect of the invention provides a method of controlling an electric motor for use in a ventilation system. The method comprising: providing a ventilation system comprising a blower and a duct with at least one opening, the blower comprising a motor and a fan coupled to the motor, the blower being configured to generate an airflow through the at least one opening; conducting a test operation of the blower for collecting data indicative of the motor's operation in the ventilation system; processing the data collected from the test operation to generate a correction coefficient; and conducting a feedback control using a target value, which has been modified using the correction coefficient.

In the foregoing method, the test operation may be conducted under a condition where a static pressure inside the duct may be substantially the minimum. The test operation may be conducted under a condition where the at least one opening may be substantially fully open. Conducting the test operation may comprise: running the motor; changing the rotational speed of the motor; and monitoring the electric current while changing the rotational speed. Changing the rotational speed may comprise gradually increasing or decreasing the rotational speed. The collected data may comprise a relationship between an electric current applied to the motor and the motor's rotational speed monitored during at least part of the test operation. Processing the data may comprise: computing values of the correction coefficient using an electric current and a rotational speed collected during at least part of the test operation; and associating each value of the correction coefficient with a volumetric airflow rate. The method may further comprise: storing the values of the correction coefficient and associated volumetric airflow rates in a memory.

Still in the foregoing method, the target value may be associated with a volumetric airflow rate and has been modified using the correction coefficient that may be associated with the same volumetric airflow rate. The target value for the feedback control would have been different unless modified using the correction coefficient. Conducting a feedback control may comprise a constant I·RPM control, which attempts to make a product of an electric current and a rotational speed within proximity of the target value. The target value of the feedback control may be a fraction of a product of a rated electric current and a rated rotational speed, which has been modified using the correction coefficient. The constant I·RPM control may be conducted in a range of electric current, which is greater than a reference current value. The reference current value may be a fractional value of a rated electric current of the motor.

Still in the foregoing method, conducting a feedback control may comprise: receiving a user input of a desired level of airflow rate; and computing the target value that corresponds to the desired level and may be modified based on the correction coefficient. Conducting a feedback control may comprise a constant RPM control, which attempts to make a rotational speed within proximity of the target value. The target value of the feedback control may be a fraction of a rated rotational speed of the motor, which has been modified using the correction coefficient. The method may further comprise receiving a user's input of a desired rotational speed, which becomes the target value. The correction coefficient may be to compensate at least some variations caused by the motor's unique relationship between an electric current applied to the motor and a rotational speed of the motor. The feedback control may generate a substantially constant airflow rate while a static pressure within the duct significantly changes. The system may not comprise an airflow rate sensor for detecting an airflow rate generated by the blower, wherein the feedback control does not use an input of an airflow rate generated by the blower. The system may not comprise a static pressure sensor for detecting the static pressure within the duct, wherein the feedback control does not use an input of a static pressure within the duct.

A further aspect of the invention provides a motor control apparatus for a ventilation system. The apparatus comprises: an electric current sensor configured to detect an electric current applied to a motor; a speed sensor configured to detect a rotational speed of the motor; and a controller configured to conduct a feedback control of adjusting a product of the electric current and the rotational speed to stay within proximity of a target value.

In the foregoing apparatus, the controller may be further configured to compare the electric current against a reference value, and to conduct the feedback control when the electric current is greater than the reference value. The controller may be further configured to compare the electric current against a reference value, and to conduct another feedback control of adjusting the rotational speed stay within proximity of a second target value when the electric current is smaller than the reference value. The controller may be further configured to compare the electric current against a reference value, and to transition between a first control mode and a second control mode based on the comparison, wherein in the first control mode the controller may be configured to conduct the feedback control, wherein in the second control mode the controller may be configured to conduct another feedback control of adjusting the rotational speed stay within proximity of another target value.

The foregoing apparatus may further comprise at least one user input interface configured to receive a user's desired level of airflow rate and to further receive a user's desired level of rotational speed. The controller may be further configured to use the user's desired level of airflow rate for the feedback control and to use the user's desired level of rotational speed for another feedback control. At least one of the feedback control and the other feedback control may be designed to achieve a substantially constant airflow rate in different static pressure ranges.

The controller may be further configured to control the motor's operation so as to generate a substantially constant airflow rate from a fan coupled with the motor, wherein the controller may not require an input of the static pressure for the feedback control. The controller may be further configured to control the motor's operation so as to generate a substantially constant airflow rate from a fan coupled with the motor, wherein the controller may not require an input of the airflow rate generated by the fan for eh feedback control. The controller may be further configured to conduct a test operation to collect a relationship between the electric current and the rotational speed, wherein the controller may be further configured to compute a correction coefficient using the collected relationship, wherein the controller may be further configured to modify a target value for a feedback control using the correction coefficient.

A further aspect of the invention provides a motor control apparatus for a ventilation system. The apparatus comprises:

an electric current sensor configured to detect an electric current applied to a motor; a speed sensor configured to detect a rotational speed of the motor; and a controller configured to compare the electric current against a reference value, and to conduct a feedback control of adjusting the rotational speed stay within proximity of a second target value when the electric current may be smaller than the reference value.

A further aspect of the invention provides a motor control apparatus for a ventilation system. The apparatus comprises: an electric current sensor configured to detect an electric current applied to a motor; a speed sensor configured to detect a rotational speed of the motor; and a controller configured to compare the electric current against a reference value, and to transition between a first control mode and a second control mode based on the comparison, wherein in the first control mode the controller may be configured to adjust a product of the electric current and the rotational speed to stay within proximity of a first target value, wherein in the second control mode the controller may be configured to adjust the rotational speed stay within proximity of a second target value.

A further aspect of the invention provides a motor control apparatus for a ventilation system. The apparatus comprises: an electric current sensor configured to detect an electric current applied to a motor; a speed sensor configured to detect a rotational speed of the motor; at least one user input interface configured to receive a user's desired level of airflow rate and to further receive a user's desired level of rotational speed; and a controller configured to use the user's desired level of airflow rate for a first control mode and to use the user's desired level of rotational speed for a second control mode.

A further aspect of the invention provides a motor control apparatus for a ventilation system. The apparatus comprises: an electric current sensor configured to detect an electric current applied to a motor; a speed sensor configured to detect a rotational speed of the motor; and a controller configured to control the motor's operation so as to generate a substantially constant airflow rate from a fan coupled with the motor, wherein the controller may be configured to accomplish the substantially constant airflow rate over a significant range of a static pressure in a duct in which the blower may be installed without an input of the static pressure. The system may not comprise a static pressure sensor for detecting the static pressure in the duct.

A further aspect of the invention provides a motor control apparatus for a ventilation system. The apparatus comprises: an electric current sensor configured to detect an electric current applied to a motor; a speed sensor configured to detect a rotational speed of the motor; and a controller configured to control the motor's operation so as to generate a substantially constant airflow rate from a fan coupled with the motor, wherein the controller may be configured to accomplish the substantially constant airflow rate over a significant range of a static pressure in a duct in which the blower may be installed without an input of the airflow rate generated by the fan. The system may not comprise an airflow rate sensor for detecting the airflow rate generated by the fan.

A further aspect of the invention provides a motor control apparatus for a ventilation system. The apparatus comprises: an electric current sensor configured to detect an electric current applied to a motor; a speed sensor configured to detect a rotational speed of the motor; and a controller configured to conduct a test operation to collect a relationship between the electric current and the rotational speed, wherein the controller may be further configured to compute a correction coefficient using the collected relationship, wherein the controller may be further configured to modify a target value for a feedback control using the correction coefficient.

In the foregoing apparatus, the controller may be further configured to gradually change the rotational speed of the motor and monitor the electric current to collect the relationship. The controller may be further configured to generate values of the correction coefficient for various airflow rates. The controller may be configured to modify the target value at a given airflow rate using a value of the correction coefficient corresponding to the given airflow rate.

DETAILED DESCRIPTION OF EMBODIMENTS

Figure 1:
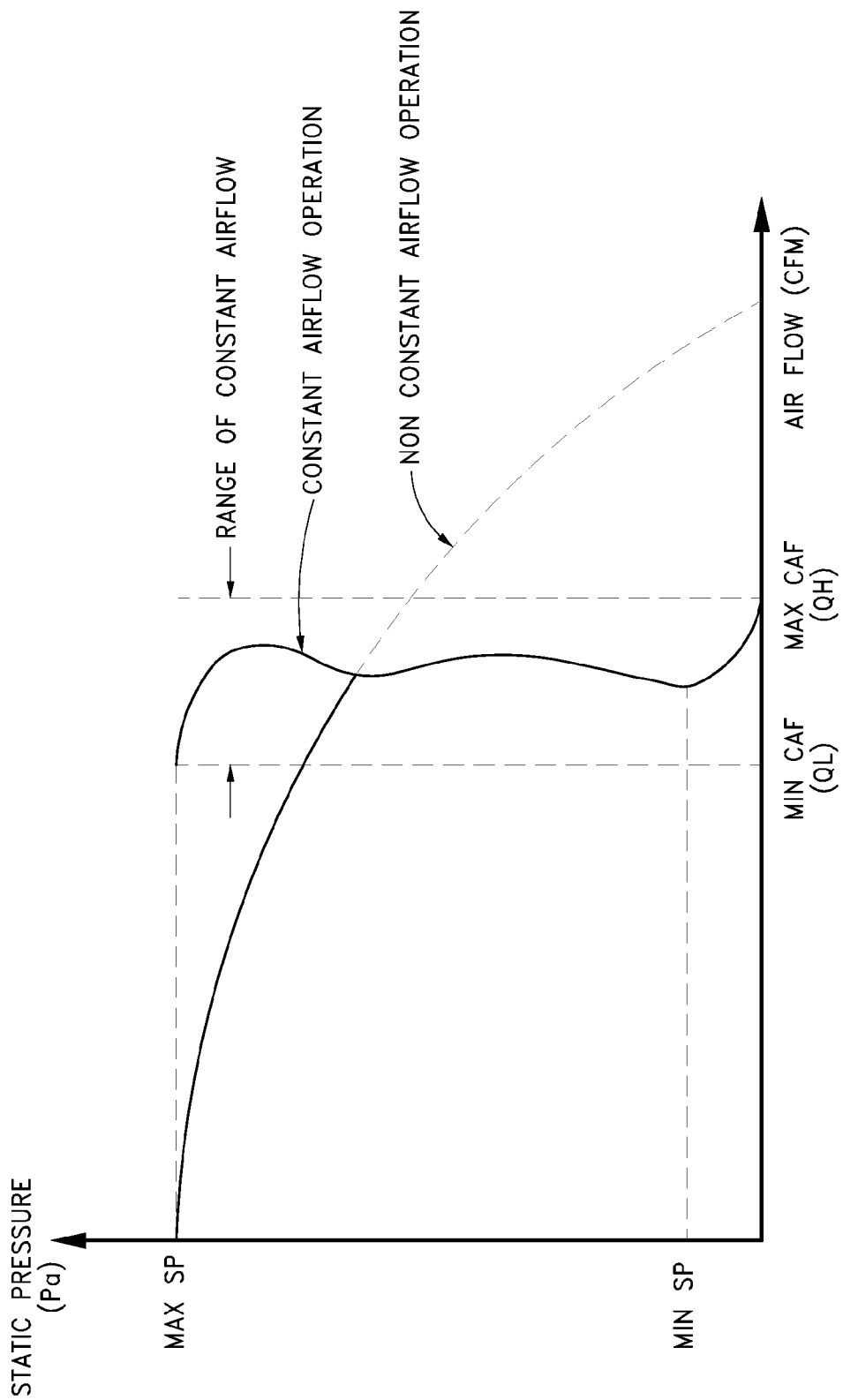
FIG. 1 illustrates a constant airflow operation and a non-constant airflow operation in a ventilation system while static pressure inside a duct changes.

Various embodiments of the invention will be discussed in more detail below, with reference to the drawings. The sizes and shapes of elements shown in the drawings do not represent actual sizes or shapes, nor represent relative sizes of the elements shown in a single drawing.

Static Pressure Changes in a Ventilation System

As discussed above in the Background section, a ventilation system typically includes a motor, a fan coupled to the motor and a ventilation duct to guide air blown by the fan. The pressure inside the ventilation duct (static pressure) changes for many reasons. The static pressure inside the duct changes, for example, when an object is placed inside the duct or in front of an opening of the duct. Dust accumulated within the duct or in a filter installed in the duct can increase the static pressure inside the duct. The static pressure changes make the airflow control difficult. In particular, the static pressure changes in the duct influence the operation of the motor.

Motor Controller

In embodiments, a motor control circuit or controller controls operation of the motor for adjusting the air flow rate in a ventilation system. More specifically, the controller controls the operation of the motor to generate a substantially constant airflow rate in the duct. In one embodiment, the controller controls the motor operation to generate a substantially constant airflow rate over static pressure changes in the duct of the ventilation system. The controller may not require a static pressure sensor for monitoring the static pressure changes or a feedback control based on a monitored static pressure input. Also, the controller may not require an airflow rate sensor for monitoring the airflow rate changes or a feedback control based on a monitored airflow rate input. In some embodiments the controller are imbedded in the motor, and in others the controller is separate from the motor.

In one embodiment, the controller or its associated sensor monitors the rotational speed (e.g., RPM) of the motor and utilizes the monitored speed for the control of the airflow rate. In one embodiment, the controller or its associated sensor monitors the electric current applied to the motor and utilizes the monitored electric current for the control of the airflow rate. As will be discussed in detail, in one embodiment, the controller processes the rotational speed input and the electric current input so as to determine the length of time during which the power is turned on (i.e., turn-on period) to accomplish a substantially constant airflow. In this embodiment, the controller controls the airflow rate using intrinsic information of the motor's operation, such as rotational speed and electric current, rather than using extrinsic information such as static pressure and airflow rate.

Substantially Constant Airflow

FIG. 1 plots changes of the airflow rate (volume/time) over changes of static pressure in a ventilation duct. Line 20 represents a constant airflow control of the motor operation according to an embodiment of the invention. Line 22 represents non-controlled operation of a motor, in which the airflow rate decreases as the static pressure increases. In the constant airflow control line 20, the airflow rate, e.g., in CFM (cubic feet per minute) stays substantially constant over significant changes in the static pressure. In other words, the airflow rate remains within a range between a lower limit QL and a higher limit QH regardless the change of the static pressure.

According to embodiments of the invention, the controller attempts to control the motor's operation such that the airflow rate changes like the constant airflow control line 20 at least for a static pressure range. As a result when the motor operates under the constant airflow control, the airflow rate stays substantially constant for at least part of the span of static pressure changes or throughout the span of the static pressure changes.

Here, a substantially constant airflow means that the airflow rate remains within a range as the static pressure changes. According to various embodiments, the range for a substantially constant airflow rate can be about 2, 4, 8, 10, 12, 14, 16, 18, 20, 22, 24, 26, 28 or 30 percent of the total range in which the airflow rate can change when there is no airflow control. Alternatively, the range for a substantially constant airflow rate can be about 1, 3, 7, 9, 11, 13, 15, 17, 19, 21, 23, 25, 27 or 29 percent of the range of the airflow rates between 0 CFM and the maximum airflow rate the motor can generate in a given ventilation system.

Alternatively, a substantially constant airflow means that the airflow rate is within proximity of a target value as the static pressure changes. According to various embodiments, the airflow rate is within proximity of a target value when the airflow rate is within about 2, 4, 8, 10, 12, 14, 16, 18, 20, 22, 24, 26, 28 or 30 percent of the total span of the airflow rate. Alternatively, "within proximity" is accomplished when the airflow rate is within about 1, 3, 7, 9, 11, 13, 15, 17, 19, 21, 23, 25, 27 or 29 percent of the range of the airflow rates between 0 CFM and the maximum airflow rate the motor can generate in a given ventilation system.

Figure 2:
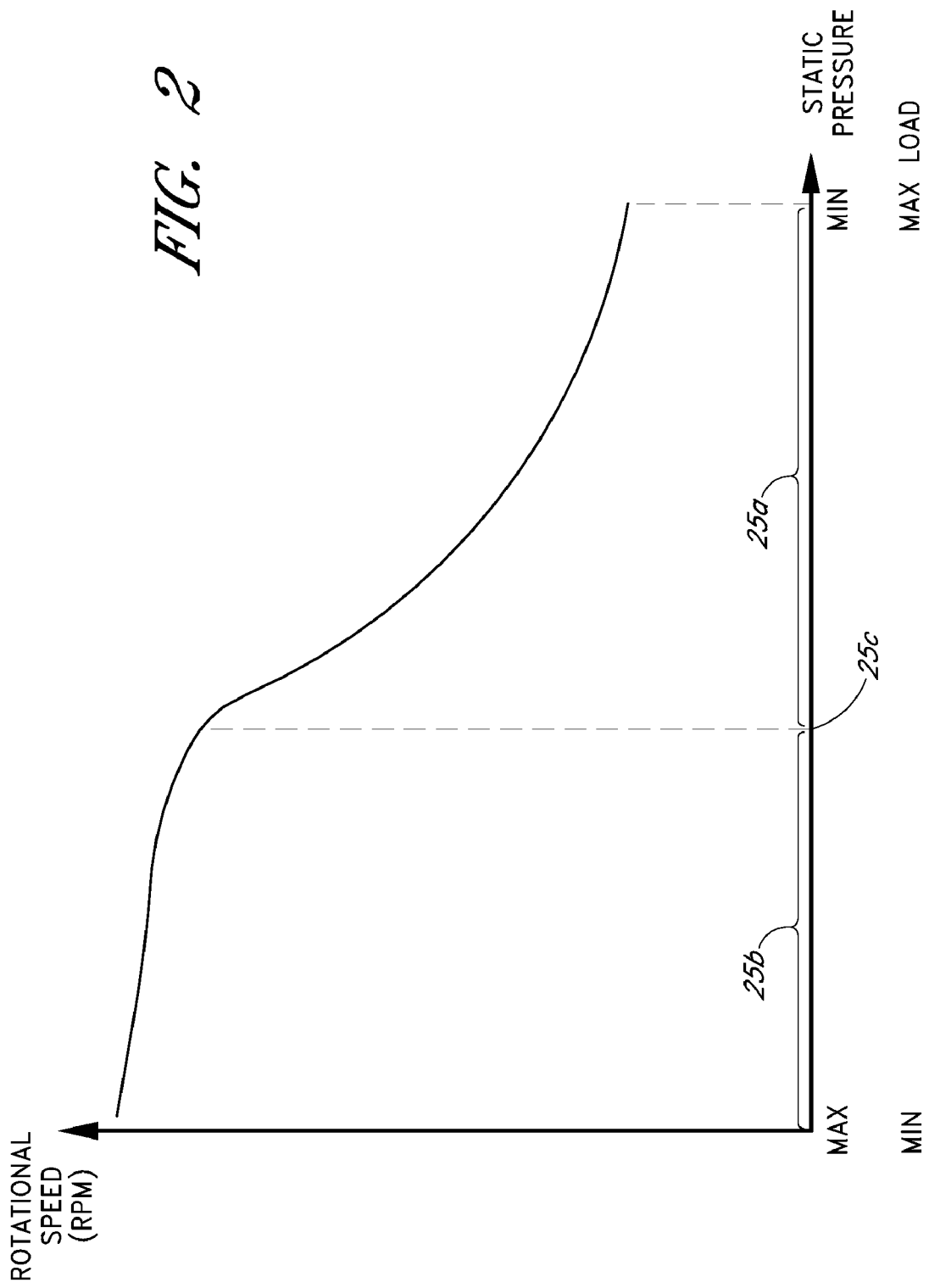
FIG. 2 illustrates a typical relationship between static pressure and motor's speed (RPM) in a constant airflow operation.

FIG. 2 illustrates a typical relationship between a motor's RPM and the static pressure changes in a duct when substantially constant airflow is accomplished and maintained throughout the static pressure range. In the static pressure range 25a between the minimum static pressure and a midpoint 25c, the motor's RPM changes significantly as the static pressure changes. On the other hand, the static pressure range 25b between the midpoint 25c and the minimum static pressure, the motor's RPM changes significantly less than in the range 25a as the static pressure changes. In one embodiment, the controller uses the motor's RPM and the electric currently applied to the motor to control the motor operation and emulate the relationship illustrated in FIG. 2.

Constant Airflow Control

In a ventilation system having an outlet with a variable opening area, an airflow rate (Q) can be represented by Formula 1 below, in which "A" denotes the open area of the outlet and "V" denotes the speed of the air passing the outlet.

$$Q = A \times V \qquad (1)$$

The open area (A) of the outlet has a generally direct relationship with a load applied to the motor. As the open area (A) of the outlet increases, the load applied to the motor generally proportionally increases. Assuming all other conditions remain the same, an increase of the load increases the electric current (I) applied to the motor. Thus, the open area (A) of the outlet and the electric current (I) applied to the motor have the general relationship of Formula 2.

$$I \propto A \qquad (2)$$

The speed of air (V) passing the outlet opening is generally proportional to the motor's rotational speed (e.g., RPM), assuming all other conditions remain the same. Thus, the motor's RPM and the speed (V) of air have the general relationship of Formula 3.

$$RPM \propto V \qquad (3)$$

In view of the foregoing relationships, the airflow rate (Q) of a ventilation system can be represented using the electric current (I) and the motor's speed (RPM) as in Formula 4, in which "α" is a constant coefficient.

$$Q = \alpha \cdot I \cdot RPM \qquad (4)$$

As noted above, a constant airflow control is to maintain the airflow rate (Q) constant or substantially constant. Thus, in theory, the constant airflow control can be accomplished by maintaining the product of the electric current (I) and the motor's speed (RPM) to stay constant while running the motor. This relationship is represented in Formula 5.

$$I \cdot RPM = \text{constant} \qquad (5)$$

The relationship of Formula 5 is used in some embodiments of the invention. The foregoing discussion to reach Formula 5 provides some scientific and practical relationship among the variables (Q, A, V, RPM and I) in the ventilation system. However, their representations may not be exact in actual ventilation systems. As such, the present invention and its embodiments are not bound by any theory, even including the foregoing discussion to arrive in Formula 5.

Constant I·RPM Control

According to various embodiments, a motor control system controls the operation of the motor such that the I·RPM value remains constant or substantially constant. Here, a substantially constant I·RPM means that the product of the electric current and the motor's speed remains within a range as the static pressure changes. The range for a substantially constant I·RPM can be about 1, 2, 3, 4, 5, 6, 7, 8, 9, 10 percent of the total range in which the motor's I·RPM can change. Optionally the range is about 0.5, 1, 1.5, 2, 2.5, 3, 3.5, 4, 4.5, 5, 5.5 or 6 of the total I·RPM range. Alternatively, the I·RPM range can be about 1, 2, 3, 4, 5, 6, 7, 8, 9 or 10 percent of the product of the rated speed ($RPM_0$) and rated current ($I_0$) of the motor. Optionally the range is about 0.5, 1, 1.5, 2, 2.5, 3, 3.5, 4, 4.5, 5, 5.5 or 6 percent of the product ($I_0 \cdot RPM_0$).

In certain embodiments, the motor control system conducts a feedback control of the motor operation. In one embodiment, the feedback control attempts to make the I·RPM value reach a target value. During the feedback control, the I·RPM value changes in the vicinity of the target value. In another embodiment, the feedback control makes the I·RPM value stay within proximity of a target value. Here, the I·RPM value is in the vicinity or within proximity of a target value when the I·RPM value at a given time is apart from the target value by less than about 1, 2, 3, 4, 5, 6, 7, 8, 9, 10 percent of the total range in which the motor's I·RPM can change. Optionally the proximity range is less than about 0.5, 1, 1.5, 2, 2.5, 3, 3.5, 4, 4.5, 5, 5.5 or 6 of the total I·RPM range. Alternatively, the I·RPM value is within proximity of a target value range when the I·RPM value at a given time is apart from the target value by less than about 1, 2, 3, 4, 5, 6, 7, 8, 9 or 10 percent of the product of the rated speed ($RPM_0$) and rated current ($I_0$) of the motor. Optionally the proximity range is less than about 0.5, 1, 1.5, 2, 2.5, 3, 3.5, 4, 4.5, 5, 5.5 or 6 percent of the product ($I_0 \cdot RPM_0$).

Figure 3:
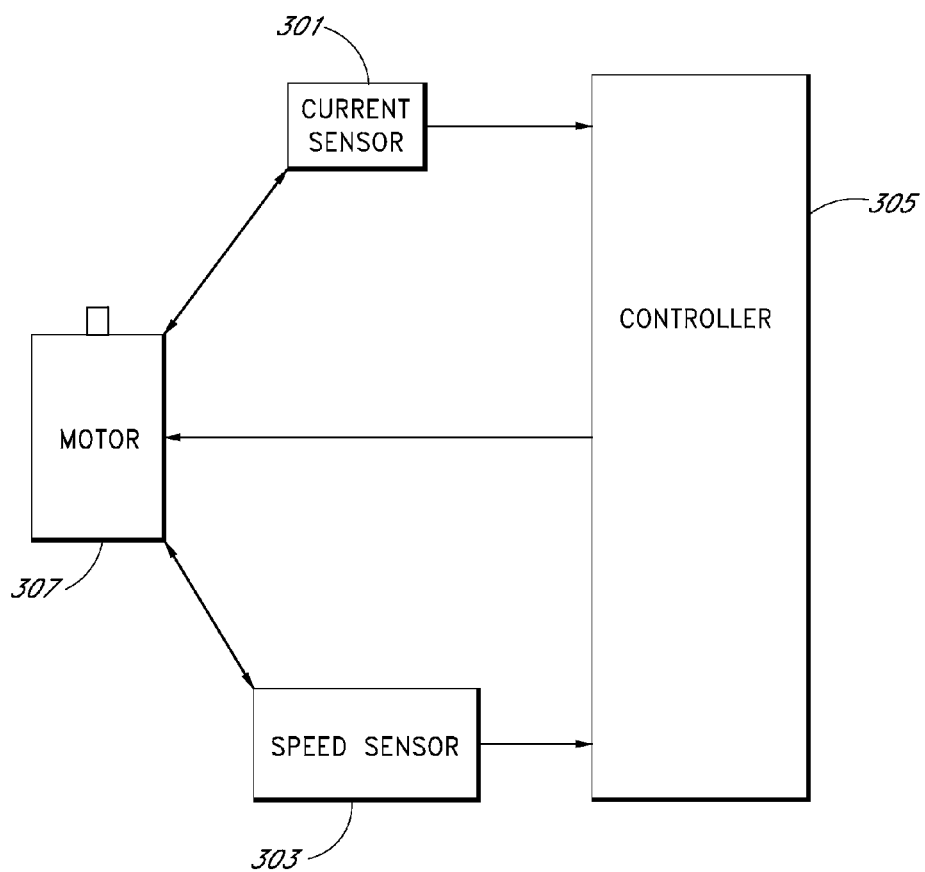
FIG. 3 is a block diagram of a motor control system according to one embodiment.

To implement this control, referring to FIG. 3, the motor control system includes a current sensor 301, a speed sensor 303, a controller 305 and a motor 307. The current sensor 301 detects and monitors the electric current (I) applied to the motor 307. Also, the speed sensor 303 detects and monitors the rotational speed (RPM) of the motor 307. These sensors 301, 303 and/or the controller 305 can be implemented within the motor housing or outside.

Figure 4:
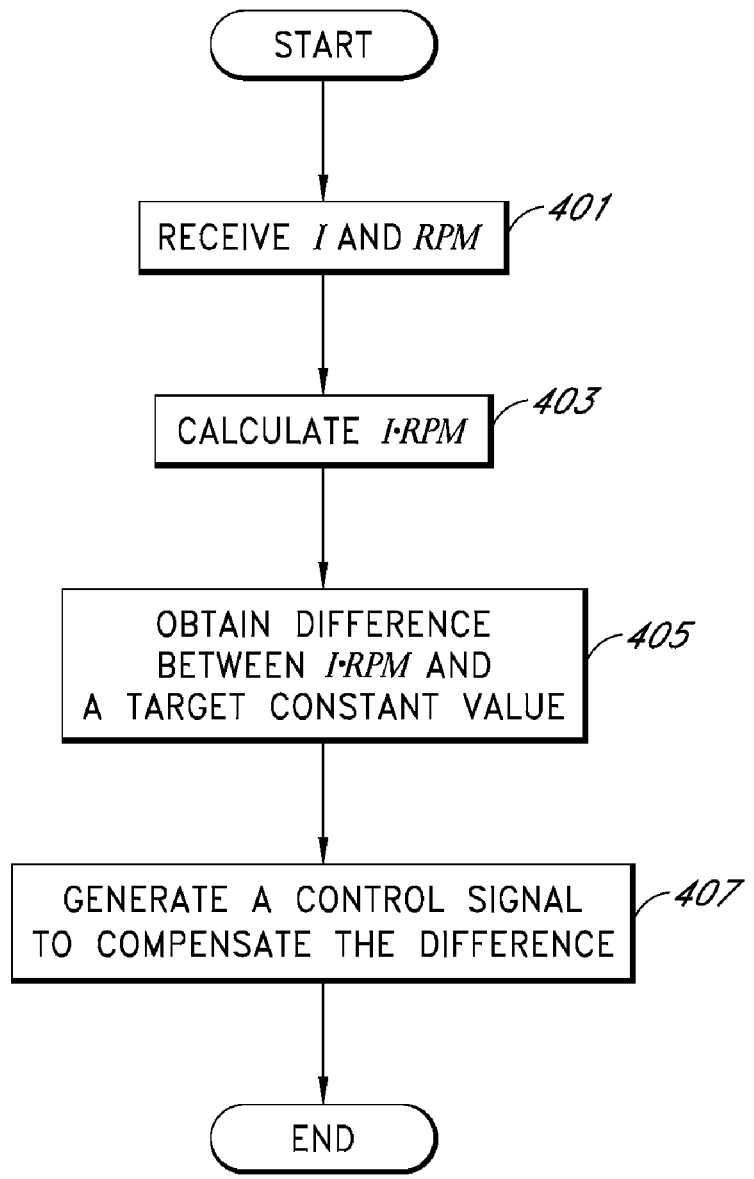
FIG. 4 is a flow chart for a constant I·RPM motor control operation according to one embodiment.

FIG. 4 is a flow chart for the motor control operation in accordance with one embodiment. In step 401, the controller 305 receives the electric current (I) and the motor speed (RPM) from the current sensor 301 and speed sensor 303. In one embodiment, the electric current (I) and the motor speed (RPM) are tagged with the time of sensing. For this purpose, in one embodiment, the current sensor 301 and speed sensor 303 are synchronized. In one embodiment, the electric current (I) and the motor speed (RPM) are substantially continuously supplied to the controller 305. In one embodiment, the electric current (I) and the motor speed (RPM) are supplied to the controller 305 periodically or sporadically.

Then, the controller 305 processes the inputs and generates a control signal to control the motor's operation. In step 403, the controller 305 calculates the I·RPM value by multiplying the inputted electric current (I) and the motor speed (RPM) that are detected at the same time. In the alternative, the controller 305 may obtain an equivalent value of the I·RPM value (e.g., I·RPM value multiplied by a coefficient). Following, in step 405, the controller 305 compares the resulting value against a target constant value for the constant airflow control so as to obtain a difference between them. In one embodiment, the target constant value is predetermined or preprogrammed. In another embodiment, the target constant value is chosen during the operation using the I·RPM values of earlier time of the same operation.

Subsequently in step 407, the controller 305 generates a control signal to compensate the difference obtained in the previous step. In one embodiment, the control signal specifies the length of period during which the electric current is applied to the motor, i.e., the power is on. To compensate varying values of the difference, the controller 305 changes the length of period, which in turn changes the speed of the motor. The length of the period has generally proportional relationship with the speed of the motor. Thus, when the controller 305 generates a control signal specifying a longer period, the speed of the motor increases, vice versa. In one embodiment, the length of period is represented in a pulse width using a pulse width modulation (PWM). In another embodiment, the controller uses a method other than the PWM. Also, in other embodiments, the control signal specifies one or more other variables to compensate the electric difference obtained in the previous step.

The foregoing control for a constant I·RPM value can provide a substantially constant airflow through the ventilation outlet. The substantially constant airflow can be obtained throughout the span of the static pressure or in at least only part of the span of the static pressure. The relationship between the motor's RPM and static pressure from this constant I·RPM control is similar to the profile of FIG. 2 in at least part of the static pressure span. Thus, using the constant I·RPM control, a substantially constant airflow can be achieved over the changes of the static pressure.

In the discussed embodiments, the constant airflow control is performed over a range of static pressure changes without the need of a static pressure sensor for monitoring the static pressure and without a feedback control using an input of static pressure. Further, the constant airflow control is performed over a range of static pressure changes without the need of an airflow rate sensor for monitoring the airflow rate in the duct or outlet and further without a feedback control using an input of airflow rate.

In certain conditions, the constant I·RPM control provides a better result in some static pressure ranges than others. Thus, while in some embodiment, the constant I·RPM control is used throughout the static pressure range; in other embodiment, the constant I·RPM control only in a certain static pressure range. In one embodiment, the constant I·RPM control is used in a lower static pressure range as in the range 25a of FIG. 2, which generally corresponds to a higher electric current.

In one embodiment, the constant I·RPM control is used when the electric current is higher than a value, which is predetermined or chosen during the operation. In another embodiment, the constant I·RPM control is used when the electric current is within a range. In another embodiment, the constant I·RPM control is used in a higher static pressure range as in the range 25a of FIG. 2, which corresponds to a lower electric current. In another embodiment, the constant I·RPM control is used when the electric current is lower than a value, which is predetermined or chosen during the operation.

Constant RPM Control

In some ventilation systems, the constant I·RPM control may not very well emulate the relationship illustrated in FIG. 2 in certain static pressure range. It is particularly true in the high static pressure range 25b, in which the motor's speed changes much less than the changes of the static pressure. Thus, in one embodiment, the controller 305 runs in a constant RPM control mode, in which the motor's rotational speed (e.g., RPM) stays constant or substantially constant in the high static pressure range 25b. Here, a substantially constant RPM means that the motor's RPM remains within a range as the static pressure changes. The range for a substantially constant RPM can be about 1, 2, 3, 4, 5, 6, 7, 8, 9, 10 percent of the total range in which the motor's RPM can change. Optionally the range is about 0.5, 1, 1.5, 2, 2.5, 3, 3.5, 4, 4.5, 5, 5.5 or 6 of the total RPM range. Alternatively, the RPM range can be about 1, 2, 3, 4, 5, 6, 7, 8, 9 or 10 percent of the rated speed ($RPM_0$) of the motor. Optionally the range is about 0.5, 1, 1.5, 2, 2.5, 3, 3.5, 4, 4.5, 5, 5.5 or 6 percent of the rated speed ($RPM_0$) of the motor.

In embodiments, the motor controller conducts a feedback control of the motor operation to achieve the constant RPM control. In one embodiment, the feedback control attempts to make the motor's rotational speed reach a target value. During the feedback control, the rotational speed changes in the vicinity of the target value. In another embodiment, the feedback control makes the rotational speed stay within proximity of a target value. Here, the rotational speed is in the vicinity or within proximity of a target value when its value at a given time is apart from the target value by less than 1, 2, 3, 4, 5, 6, 7, 8, 9, 10 percent of the total range in which the motor's rotational speed can change. Optionally the proximity range is less than about 0.5, 1, 1.5, 2, 2.5, 3, 3.5, 4, 4.5, 5, 5.5 or 6 of the total range of the rotational speed. Alternatively, the rotational speed is within proximity of a target value range when its value at a given time is apart from the target value by less than about 1, 2, 3, 4, 5, 6, 7, 8, 9 or 10 percent of the rated rotational speed ($RPM_0$) of a particular motor. Optionally the proximity range is less than about 0.5, 1, 1.5, 2, 2.5, 3, 3.5, 4, 4.5, 5, 5.5 or 6 percent of the rated rotational speed ($RPM_0$).

Figure 5:
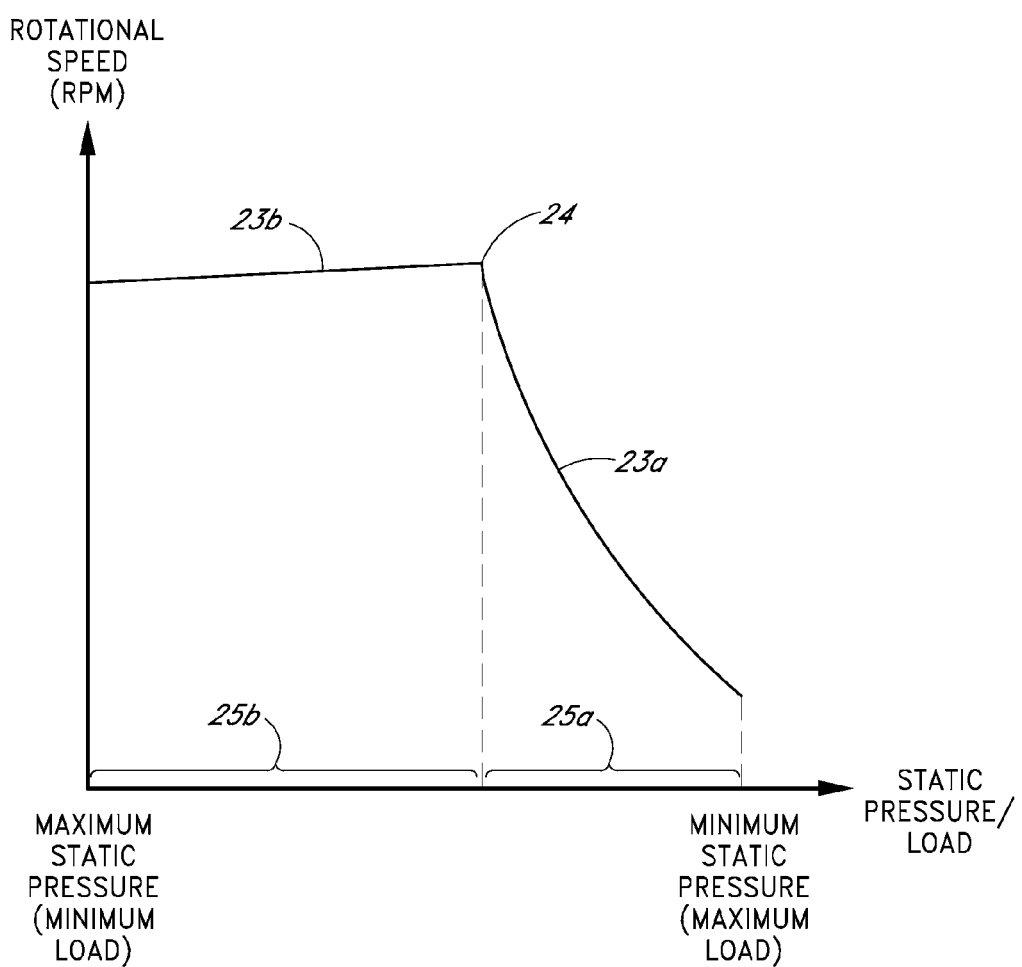
FIG. 5 illustrates a RPM-static pressure profile in a motor control operation according to one embodiment.

Referring to FIG. 5, line 23b represents this constant RPM control in the static pressure range 25b. In one embodiment, the constant RPM control is applied to only part of the range 25b. In the constant RPM control embodiments, maintaining the motor's speed constant creates a substantially constant airflow although that control may not exactly emulate the profile in FIG. 2. Also, maintaining the motor's speed constant may at least achieve a result in which the airflow rate stays within a range, which is wider than narrow. The constant RPM control is very useful in ventilation systems, which do not require a strict constant airflow control in a high static pressure range.

Transition between Constant I·RPM Control and Constant RPM Control

In FIG. 5, the line 23b represents the constant RPM control, and the line 23a represents the constant I·RPM control. As indicted in FIGS. 2 and 5, the static pressure is generally inversely proportional to the load applied to the fan and motor. Given that the load is generally proportional to the current, the transition between the two controls can be determined based on the electric current (I). In one embodiment, when the electric current is smaller than a reference electric current, the constant RPM control is chosen; and when the electric current is greater than the reference electric current, the constant I·RPM control is used. As such, the transitional point 24 is found without an input of the static pressure. The values of the reference electric current will be discussed below.

Multi-Level and Programmable Constant I·RPM Control

In one embodiment, the motor control system provides a multi-level constant airflow control, which allows users to choose a target airflow rate from multiple predetermined airflow rates. Each of the predetermined airflow rates is associated with a target value for the constant airflow control. In this embodiment, when a user selects one of the predetermined airflow rates, the controller feedback-controls the operation of the motor such that the product of the I·RPM value or its equivalent reaches and stays at about the target value associated with the user selected airflow rate.

In one embodiment, the target values associated with the multiple airflow rates are predetermined with reference to a maximum hypothetical I·RPM value, which corresponds to a maximum hypothetical airflow rate available from the ventilation system. In one embodiment, the maximum hypothetical I·RPM value refers to the I·RPM value obtained using the motor's rated current ($I_0$) and rated RPM ($RPM_0$) as in Formula 6.

$$\text{Maximum hypothetical } I\cdot RPM \text{ value} = I_0 \cdot RPM_0 \quad (6)$$

In one embodiment, the target values associated with the multiple airflow rates are predetermined with reference to a maximum hypothetical I·RPM value, which corresponds to a maximum hypothetical airflow rate available from the ventilation system. In one embodiment, the maximum hypothetical I·RPM value refers to the I·RPM value obtained using the motor's rated current ($I_0$) and rated RPM ($RPM_0$) as in Formula 6.

In one embodiment, each target value is a fraction or percentage of the maximum value obtained using Formula 6 or other appropriate formulas. Then, each airflow rate associated with the target value generally represents a corresponding fraction of the maximum hypothetical airflow rate available from the motor. Table 1 is an example listing airflow rates and associated target values that are stored in the controller 305 or an associated memory, in which the motor's maximum hypothetical I·RPM value is 20.

TABLE 1

| Airflow Rate Levels | Associated Target Values |
| --- | --- |
| 20% | 4 |
| 40% | 8 |
| 60% | 12 |
| 80% | 16 |
| 100% | 20 |

Alternatively or additionally, in one embodiment, the motor control system provides a user programmable constant airflow control, in which users are allowed to input a desired airflow rate or level rather than selecting one of preprogrammed airflow rates or levels. For example, a user inputs 35% level of constant airflow control, the controller 305 computes a target value for the 35% level, which is 35% of the maximum hypothetical I·RPM value of the motor. Then, the controller 305 controls the operation of the motor such that the I·RPM value can reach and stay at the value of 35% of $I_0 \cdot RPM_0$.

In these embodiments with multi-level and/or programmable constant airflow control, the system includes an appropriate user interface or control panel, with which users can select or input a desired airflow rate level. Further, these embodiments optionally include an appropriate indicator or display device to indicate or display the presently chosen airflow rate level.

Reference Electric Current for Transition between Controls

As discussed above, in one embodiment, the transition between the constant I·RPM control and the constant RPM control is determined based on the electric current applied to the motor. More specifically, the reference electric current differs in different airflow rate levels. In one embodiment, the reference electric current is predetermined or calculated using the rated electric current ($I_0$) of the motor. For example, the reference electric current for a certain percent airflow rate has a value of the same fraction of the rated electric current.

Table 2 is an example listing airflow rates and associated reference electric current for transitioning between the constant RPM control and the constant I·RPM control.

TABLE 2

| Airflow Rate Levels | Reference Electric Current |
|---|---|
| 30% | $0.3 \times I_0$ |
| 50% | $0.5 \times I_0$ |
| 70% | $0.7 \times I_0$ |
| 90% | $0.9 \times I_0$ |
| 100% | $I_0$ |

Multi-Level and Programmable Constant RPM Control

In one embodiment, the motor control system provides a multi-level constant speed (RPM) control, which allows users to choose a target speed value from multiple predetermined speed values. Alternatively or additionally, in one embodiment, the motor control system provides a user programmable constant RPM control, in which users are allowed to input a desired RPM value or level rather than selecting one of preprogrammed RPM values.

In one embodiment, the target RPM values are predetermined with reference to the rated RPM ($RPM_0$) of a motor or another reference RPM value. In one embodiment, each target RPM value is a percentage or fractional level of the rated RPM ($RPM_0$) or the other reference value. In these embodiments, in a percentage level is chosen or inputted by a user for the performance of the constant RPM control at an RPM corresponding to the percentage level.

In these embodiments with multi-level and/or programmable constant RPM control, the system includes an appropriate user interface (not illustrated) or control panel (not illustrated), with which users can select or input a desired airflow rate level. The feature of user selection or programming of the motor speed is particularly useful to technicians who have developed certain senses about the correlation between the motor's speed and airflow rates. These technicians and experts could find a good approximation about the motor's speed to accomplish a desired airflow rate, which can be inputted to the motor control system for the constant RPM control. Further, these embodiments optionally include an appropriate indicator or display device to indicate or display the presently chosen airflow rate level.

Overall Process for Constant Airflow Control

Figure 6:
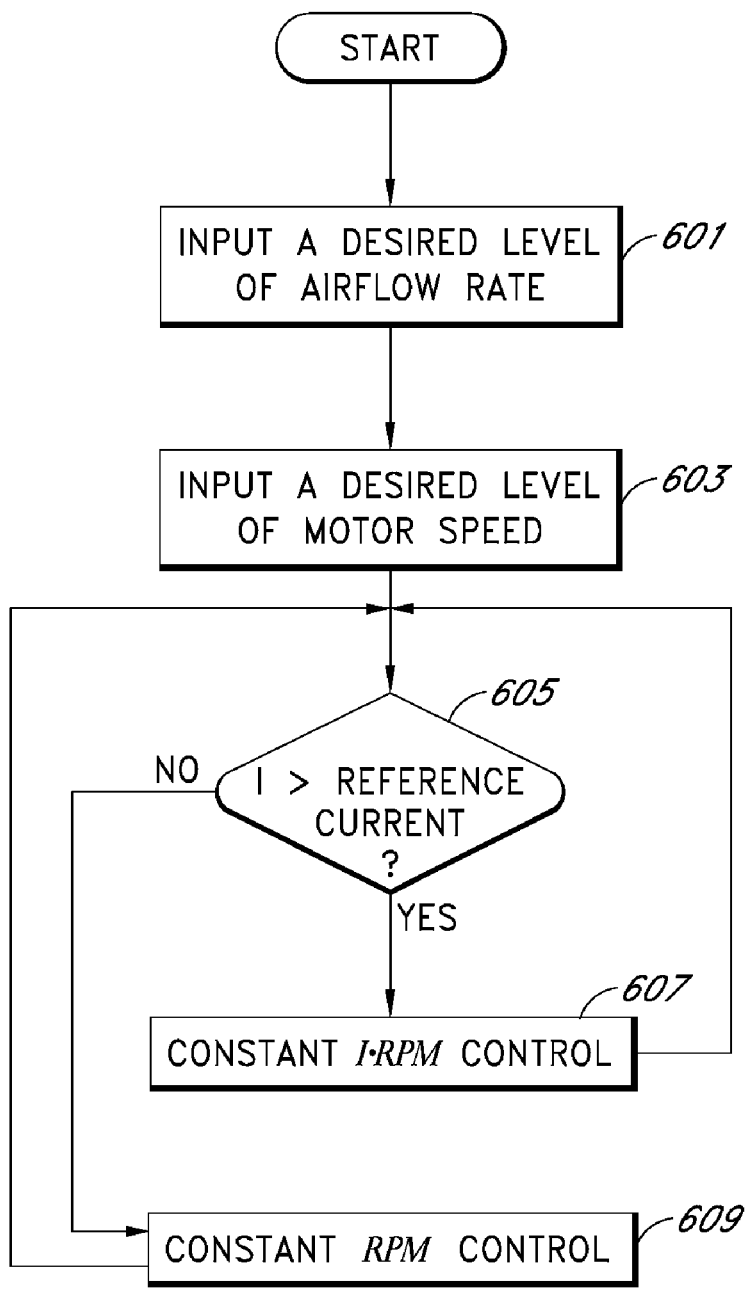
FIG. 6 is a flowchart of a motor control operation including a transition between a constant I·RPM control and a constant RPM control according to one embodiment.

FIG. 6 is a flowchart of the process of constant airflow control according to an embodiment. In step 601, a user selects or inputs a desired level of airflow rate for a constant airflow control using a user interface or a control panel of the motor or motor controller 305. In one embodiment, the selection or input of the desired level sets a desired airflow rate for the constant I·RPM control and also for the constant RPM control. In another embodiment, the desired level determines the desired airflow rate for the constant I·RPM control, and the user may need to provide a desired level of motor speed for the constant RPM control. Thus, optionally, in step 603 the user selects or inputs a desired level of motor speed, which may occur prior to step 601 in some embodiments.

Then, the user turns on and runs the motor. After a transient period for a certain rotational speed, in step 605 the controller 305 compares the electric current (I) to the reference electric current calculated based on the desired level of airflow rate. For example, in case the inputted desired level is 70%, the reference electric current is 70% of the rated electric current of the motor. In this comparison, if the electric current applied to the motor is greater than the reference electric current, the controller 305 selects the constant I·RPM control 607. On the other hand, if the electric current applied to the motor is smaller than the reference electric current, the controller 305 selects the constant RPM control 609. In one embodiment, during the operation, the controller 305 goes to step 605 and conducts the comparison constantly to determine whether to transition from one control to the other. Alternatively, the comparison of step 605 can be conducted periodically or sporadically to determine the need for transition between the controls.

Figure 7:
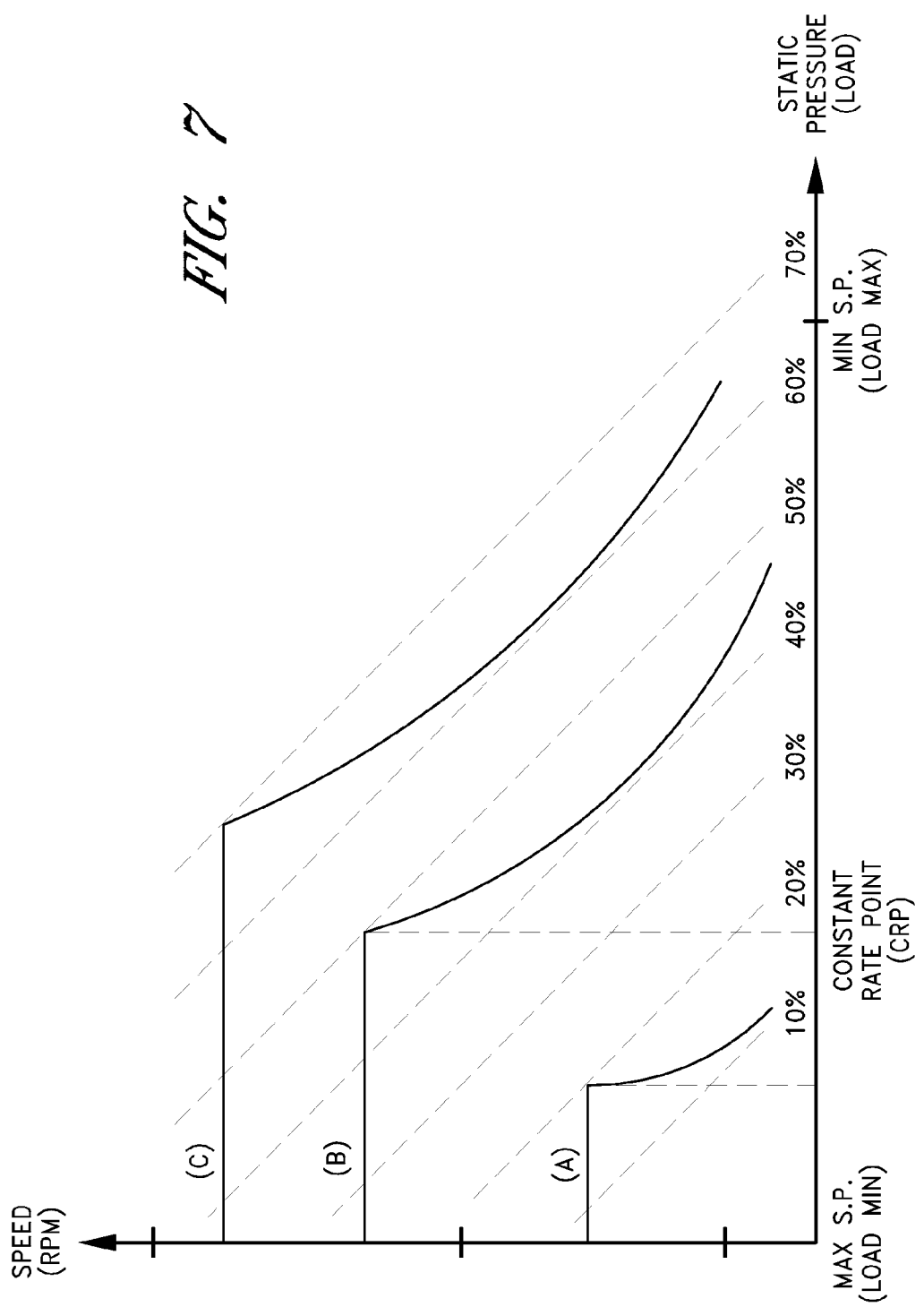
FIG. 7 illustrates an RPM-static pressure relationship in multi-level airflow controls according to one embodiment.
Figure 8:
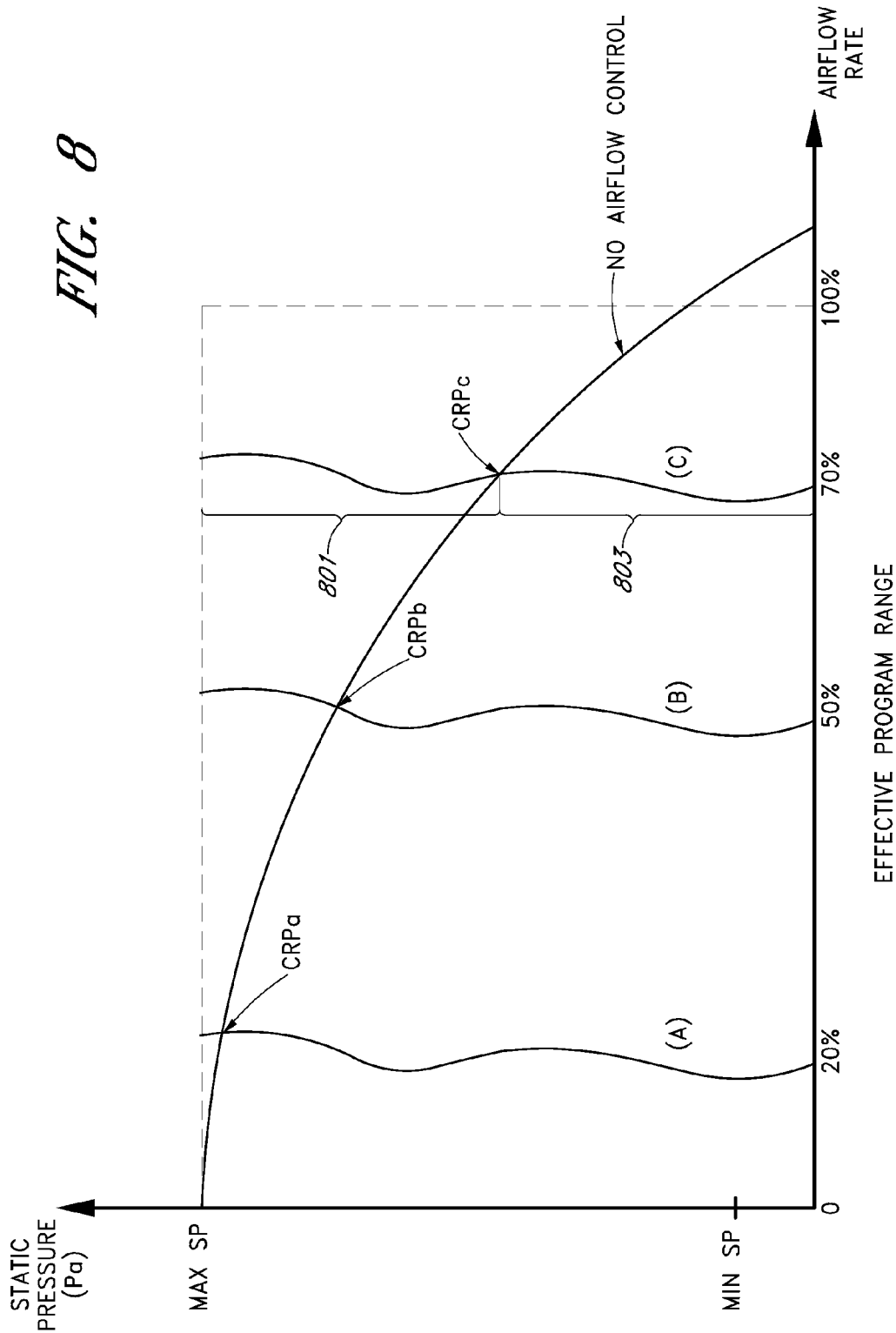
FIG. 8 illustrates a static pressure-airflow rate relationship in multi-level airflow controls according to one embodiment.

FIG. 7 illustrates the relationship between the motor speed (RPM) and static pressure in multi-level constant airflow controls, including three profiles similar to FIG. 5. The profile A represents 10% level of airflow rate control; the profile B represents 50% level; and the profile C represents 70% level. Each profile includes a constant RPM control section in the static pressure range from the maximum to a midpoint referred to as constant rate point (CRP). Also, each profile transitions to a constant I·RPM control in the static pressure range from the midpoint to the minimum static pressure. FIG. 8 illustrates the relationship between the static pressure and the airflow rate in the multi-level constant airflow controls corresponding to FIG. 7. In Profile C, the portion 801 corresponds to the higher static pressure range in which the constant RPM control is conducted; and the portion 803 corresponds to the lower static pressure range in which the constant I·RPM control is conducted.

Correction of Motor Output Variations

Motors produced with the identical design and manufacturing may not have the identical operating characteristics. Also, motors produced in the same batch may have slight differences in their responses to certain controls. Further, a single motor can have different responses to the same control action when the motor operates under different contexts, such as different designs (size, weight, configurations, etc.) of the fan coupled with the motor and different designs of the ventilation duct (size and configurations). The results of these are deviations and variations from a computed output when a control action is taken. In the constant I·RPM control or the constant RPM control, for example, the motor's response to a control action to achieve a target value can result in a slight deviation from the target value although the response is good enough to produce a generally desired result, i.e., a substantially constant airflow rate.

According to one embodiment, the controller 305 corrects these variations and deviations for better constant airflow controls. More specifically, the controller 305 conducts one or more test operations, and collects certain data specific to at least one of the motor, fan and duct configurations. In one embodiment, the test operation is carried out when the motor is coupled with a particular fan and installed in a particular ventilation duct or system. In one embodiment, the collected data are stored in a memory associated with the controller 305 and used to minimize the deviations so as to accomplish that the motor operation is close to the profile of FIG. 2 for at least part of the static pressure span. In one embodiment, the data are further processed to produce a reduced form of data that has more direct correlation with the control of the motor operation. The reduced form of data is then stored in the memory and used to achieve a desired operation of the motor for a substantially constant airflow rate.

Figure 9:
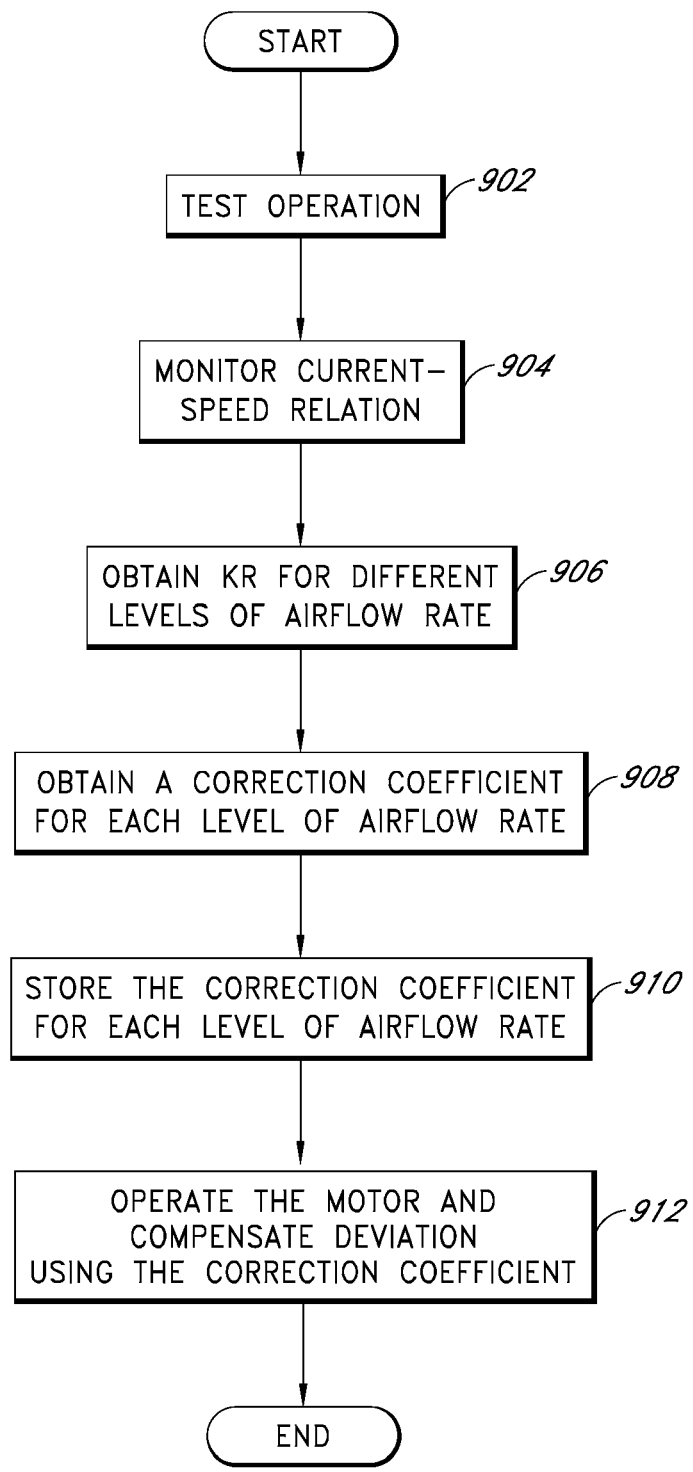
FIG. 9 is a flowchart for a test operation and a modified constant airflow control using data from the test operation according to one embodiment.

FIG. 9 is a flow chart of a process according to embodiments for correcting the motor output variations. In step 902, a test operation of the ventilation system is performed under its minimum static pressure condition. During the test operation, in step 904, the electric current applied to the motor is monitored while changing the motor's speed (e.g., RPM). In step 906, the current and RPM data obtained from the test operation is processed to produce a coefficient (e.g., Kr), which can represent deviations in the actual motor operations from its corresponding computed value at different levels of airflow rates. In step 908, a correction coefficient for compensating or correcting the deviations is obtained for each airflow rate level, and in step 910 the correction coefficient is stored in a memory associated with the controller. Then, in step 912, the motor is operated for a constant airflow control, and a control target value is compensated using the stored correction coefficient values. Various features and embodiments of the test operation and the controlled operation will be further discussed.

Test Operation

In one embodiment, the test operation is performed under the same or very similar condition where the motor is operated for ventilation. In this embodiment, in order to conduct the test, the motor is assembled with a fan and installed in the ventilation system to blow air through the duct. Thus, the test results from the test operation reflect the conditions of actual operation of the ventilation system, such as, size, design and weight of the fan, and the configuration of the duct.

Figure 10:
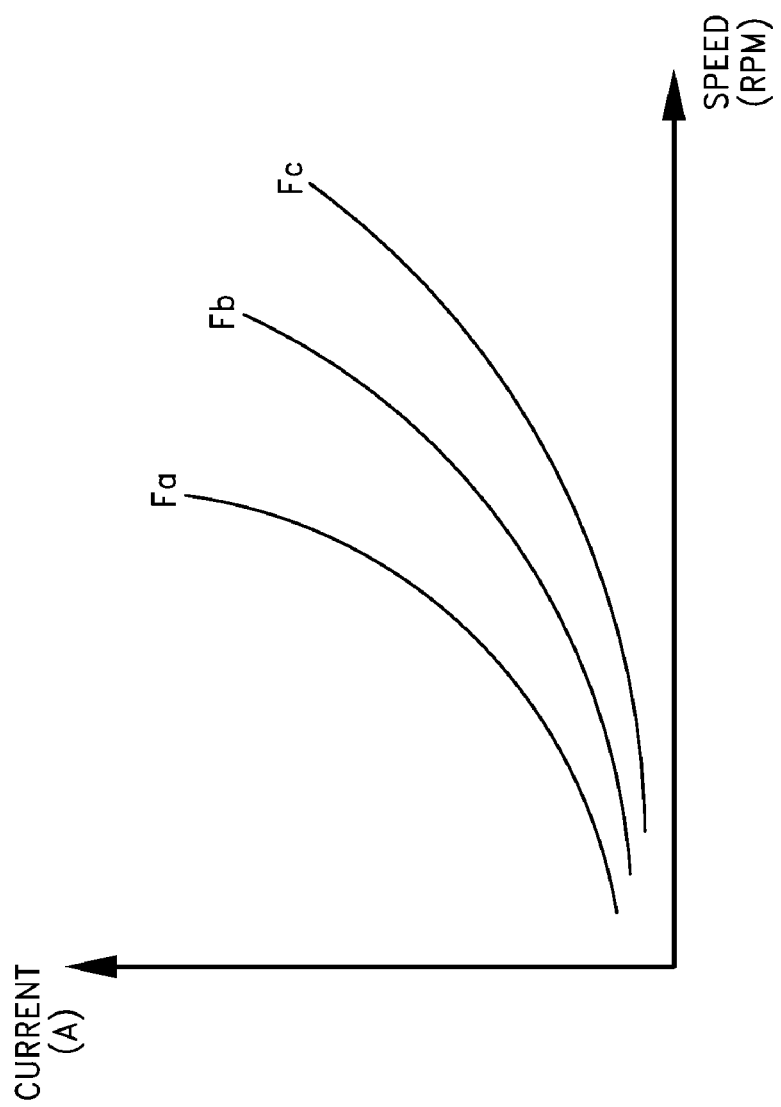
FIG. 10 illustrates a current-RPM characteristic of a motor acquired in a test operation according to one embodiment.

During the test operation, the motor is operated under the minimum static pressure condition. The ventilation duct has one or more outlets through which air blown from the fan is discharged. In one embodiment, the minimum static pressure condition can be created by opening the outlets to their maximum size. During the test operation, the motor is run while changing the RPM by changing the length of period during which the electric current is applied to the motor. In one embodiment, the motor's RPM is increased and/or decreased gradually, stepwise, randomly or in combination. In one embodiment, the motor's RPM is continuously and gradually increased. While changing the motor's RPM, the electric current applied to the motor is monitored. In embodiments, the RPM and current at each time are recorded continuously, intermittently or in combination. FIG. 10 illustrates examples of recorded current-RPM relation for three different motors or three different conditions for the same motor.

Processing Data from Test Operation

In step 906 of FIG. 9, the controller processes the data obtained from the test operation so as to produce Kr values. In one embodiment, Kr is a coefficient obtained using Formula 7, in which $\beta$ is a coefficient having a constant value.

$$Kr = \beta \cdot I/RPM \tag{7}$$

Figure 11:
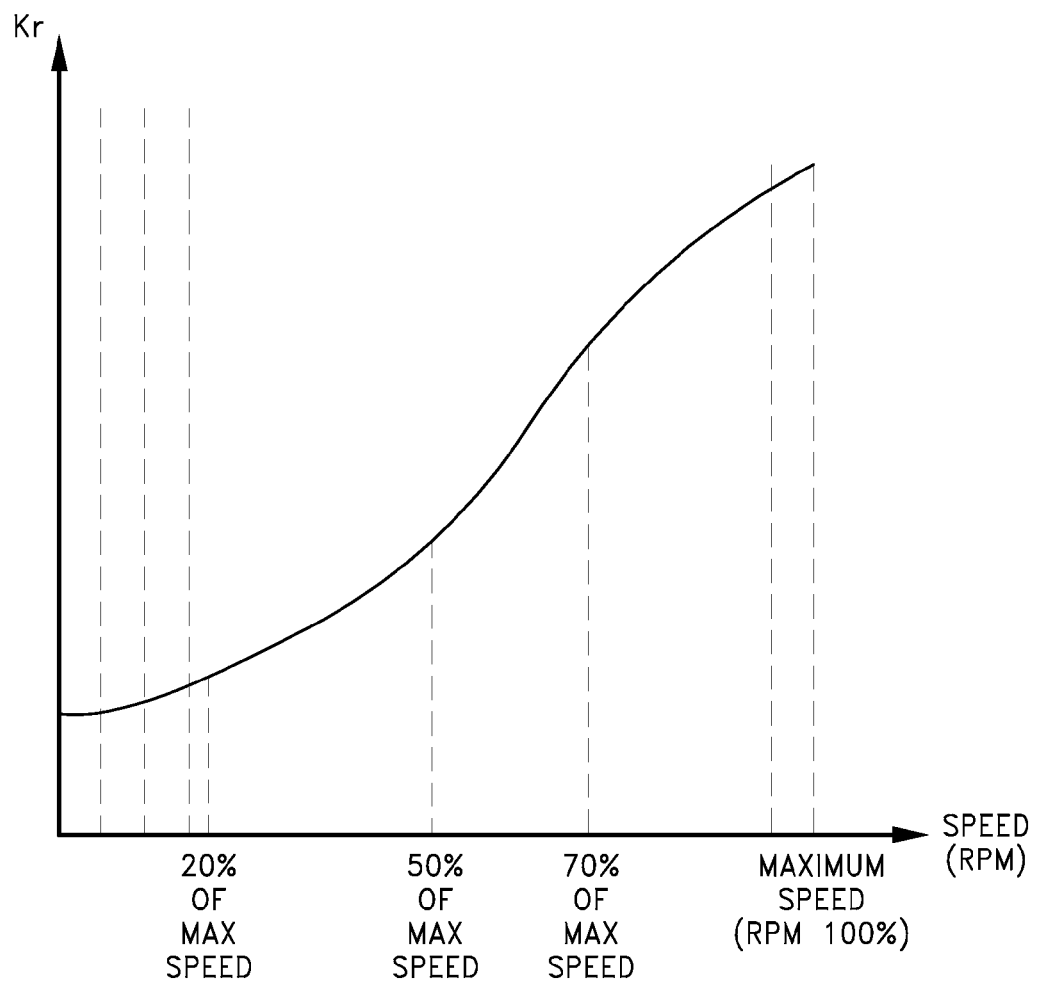
FIG. 11 illustrates a Kr-RPM relationship of a motor according to one embodiment.

In one embodiment, $\beta$ equals to "1", where Kr=I/RPM. The Kr values obtained using Formula 7 is plotted against the motor's speed in FIG. 11. In one embodiment, the Kr-RPM relation as in FIG. 11 is then converted to the relation between Kr values and different levels of airflow rate of the particular motor in the particular ventilation system. Here, the term "different levels of airflow rate" refers to various fractions of the maximum airflow rate of the motor. In one embodiment, the maximum airflow rate is the airflow rate obtainable when the rated electric current ($I_0$) and rated speed ($RPM_0$) of the motor are achieved. Using Formula 4, the maximum airflow rate is represented with the maximum hypothetical I·RPM value ($I_0 \cdot RPM_0$) in Formula 8.

$$Q_0 = \alpha \cdot I_0 \cdot RPM_0 \tag{8}$$

Figure 12:
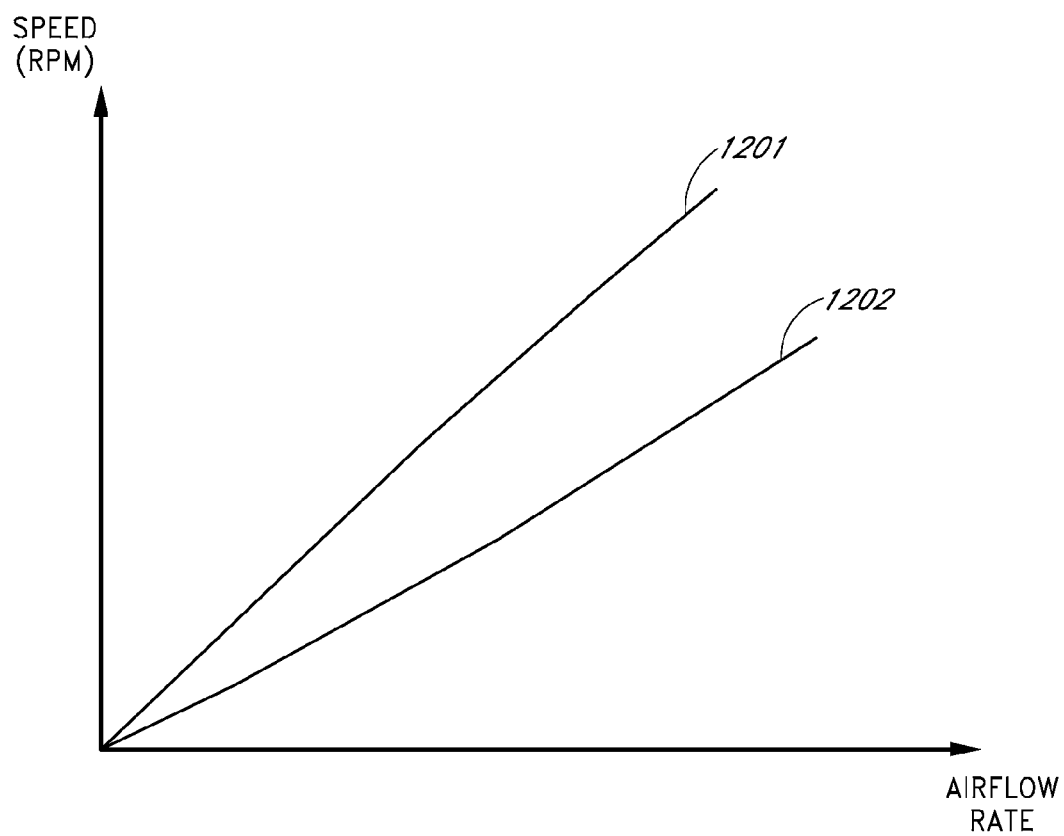
FIG. 12 illustrates an RPM-airflow rate relationship in a steady state operation of a motor when the static pressure remains constant according to one embodiment.

In one embodiment, the conversion of the Kr-RPM relation to the Kr-airflow rates relation can be based on the relation between RPM and airflow rates of the motor. Typically, the RPM of a motor is proportional to the airflow rate generated from the motor when the static pressure of the ventilation duct does not change. For example, the RPM-airflow rate relations 1201, 1202 of two motors are plotted in FIG. 12. In one embodiment, using the proportional relation between the RPM and airflow rates, the Kr-RPM relation in FIG. 11 can be converted to the Kr-airflow rate relation. In other embodiments, the Kr-RPM relation is converted to the Kr-airflow rate relation using a linear or non-linear relation between the RPM and airflow rates of a particular motor.

Figure 13:
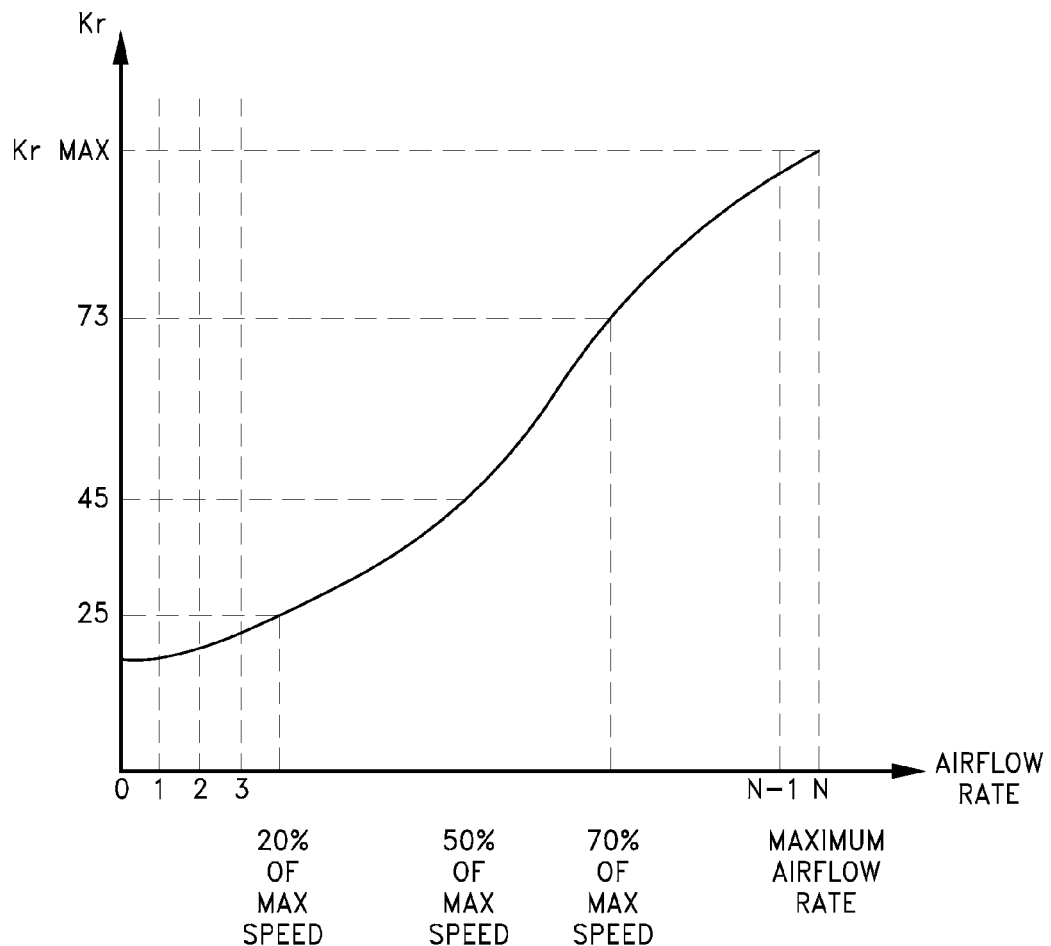
FIG. 13 illustrates a Kr-airflow rate relationship of a motor according to one embodiment.

FIG. 13 plots the Kr-airflow rate relation converted from the Kr-RPM relation of FIG. 11 according to one embodiment. The maximum RPM of FIG. 11 corresponds to the maximum airflow rate of FIG. 13, and each fractional level (e.g., percentage) of the maximum RPM of FIG. 11 corresponds to a fractional level (e.g., percentage) of the maximum airflow rate of FIG. 13. Although FIGS. 11 and 13 plot the Kr-RPM and Kr-airflow rate relations continuously, in actual embodiments these relations may be generated discontinuously. Optionally, although not included in the flowchart of FIG. 9, the resulting Kr-airflow rate relation in a continuous or discrete format is stored in a memory associated with the controller.

In step 908 of FIG. 9, a correction coefficient is obtained for each airflow rate or its fractional level. The correction coefficient can represent deviations in the actual motor operations from its corresponding computed value at different levels of the airflow rate. Thus, the correction coefficient can be used to compensate the deviations at different levels of the airflow rate. In one embodiment, the correction coefficient represents the size of deviation of the Kr value from the corresponding value computed using the rated current and rated RPM. In one embodiment, the correction coefficient ($\gamma$) is represented by Formula 9.

$$\gamma \cdot K_0 = Kr \tag{9}$$

In one embodiment, $K_0$ denotes the Kr counterpart that is computed using the rated current and rated RPM as in Formula 10.

$$K_0 = I_0/RPM_0 \tag{10}$$

Subsequently, in step 910, at least part of the resulting data is stored in a memory associated with the controller. The resulting data includes Kr values, $K_0$ values, correction coefficients ($\gamma$) for various airflow rates or their fractional levels. In one embodiment, only correction coefficient ($\gamma$) and the corresponding airflow rate or its fractional level are stored in a memory. In embodiments, either or both of the Kr values and the $K_0$ values are also stored in the memory. In one embodiment, the resulting data are stored as a table, in which each airflow rate value has a corresponding value of the correction coefficient ($\gamma$) and optionally other data obtained from the foregoing processes. Table 3 is an example listing the values of Kr, $K_0$ and $\gamma$ for each airflow rate.

TABLE 3

| Airflow Rate Levels | $Kr_0$ | Kr | $\gamma$ |
|---|---|---|---|
| 10% | $0.1 \cdot I_0/RPM_0$ = 0.00018 | 0.00019 | 0.947 |
| 20% | $0.2 \cdot I_0/RPM_0$ = 0.00024 | 0.00025 | 0.960 |
| 30% | $0.3 \cdot I_0/RPM_0$ = 0.00030 | 0.00032 | 0.938 |
| 40% | $0.4 \cdot I_0/RPM_0$ = 0.00038 | 0.00038 | 1 |
| 50% | $0.5 \cdot I_0/RPM_0$ = 0.00043 | 0.00045 | 0.956 |

TABLE 3-continued

| Airflow Rate Levels | $Kr_0$ | Kr | γ |
|---|---|---|---|
| 60% | $0.6 \cdot I_0/RPM_0 = 0.00062$ | 0.00060 | 1.033 |
| 70% | $0.7 \cdot I_0/RPM_0 = 0.00075$ | 0.00073 | 1.027 |
| 80% | $0.8 \cdot I_0/RPM_0 = 0.00085$ | 0.00082 | 1.037 |
| 90% | $0.9 \cdot I_0/RPM_0 = 0.00092$ | 0.00091 | 1.011 |
| 100% | $1 \cdot I_0/RPM_0 = 0.00099$ | 0.001 | 0.99 |

According to the embodiment represented in Table 3, the airflow rate is stored as a fraction (e.g., percentage) of the maximum airflow rate although not limited thereto. Likewise, the Kr and $K_0$ values corresponding to airflow rates can be stored as a fraction (e.g., percentage) of their maximum values or as their actual values calculated from appropriate formulae using the data obtained during the test operation. In other embodiments, the airflow rate levels are not represented in discrete numbers (e.g., 1, 2, 3, . . . , N–1, N) rather than fractions of the maximum airflow rate as also shown in FIG. 13 (see the numbers below the horizontal line).

More Accurate Constant Airflow Control

In step 912 of FIG. 9, the controller 305 uses the data stored in the memory for a more accurate constant airflow control. In embodiments, the correction coefficient (γ) is factored in to produce a modified target value in the constant I·RPM control or the constant RPM control. Each control changes a certain variable, such as the pulse width during which the electric current is applied, so as to drive the value of a formula to a target value. In certain embodiments discussed above, the target values for control is obtained or computed based on the rated values, such as the rated electric current and rated speed of the motor, which are determined from manufacturing. Now, in one embodiment, the target values are adjusted or modified based on data drawn from the motor's test operation, including the correction coefficient. More specifically the target values are modified differently at different levels of airflow rate.

In one embodiment of the constant I·RPM control, the target value is a fraction of the hypothetical maximum I·RPM. In the embodiment, this target value is adjusted using the correction coefficient (γ). In one embodiment of the constant RPM control, the target value is a fraction of the rated speed ($RPM_0$). In another embodiment of the constant RPM control, the target value is a user inputted target RPM. In these embodiments, the target value is adjusted using the correction coefficient (γ).

According to embodiments of the invention, the system provides a controller that allows the constant airflow control at various target airflow rates. Further, the controller provides for the adjustment of the constant airflow control based on the RPM and electric current relationship obtained from a test operation to make the control more accurate. These controls make the airflow rate remains substantially constant irrespective of significant changes of the static pressure in certain static pressure ranges.

Response Rate Correction

In one embodiment, constant airflow controls can be further modified and improved based on the response rate of the motor. Generally, the larger or heavier the fan coupled with the motor is, the smaller the response rate of the motor is preferred; and the smaller or lighter the fan is, the larger the response rate is preferred. In one embodiment, the system provides a user interface or control panel, with which the motor operator selects or inputs a desired motor response rate. Using this feature, the motor operator can further improve the constant airflow control to accomplish substantially constant airflow rate over the static pressure changes. Particularly, when the fan is replaced, an operator or technician can set a desired response rate based on at least one of the new fan's configuration, size and weight.

Controller Circuits

Figure 14:
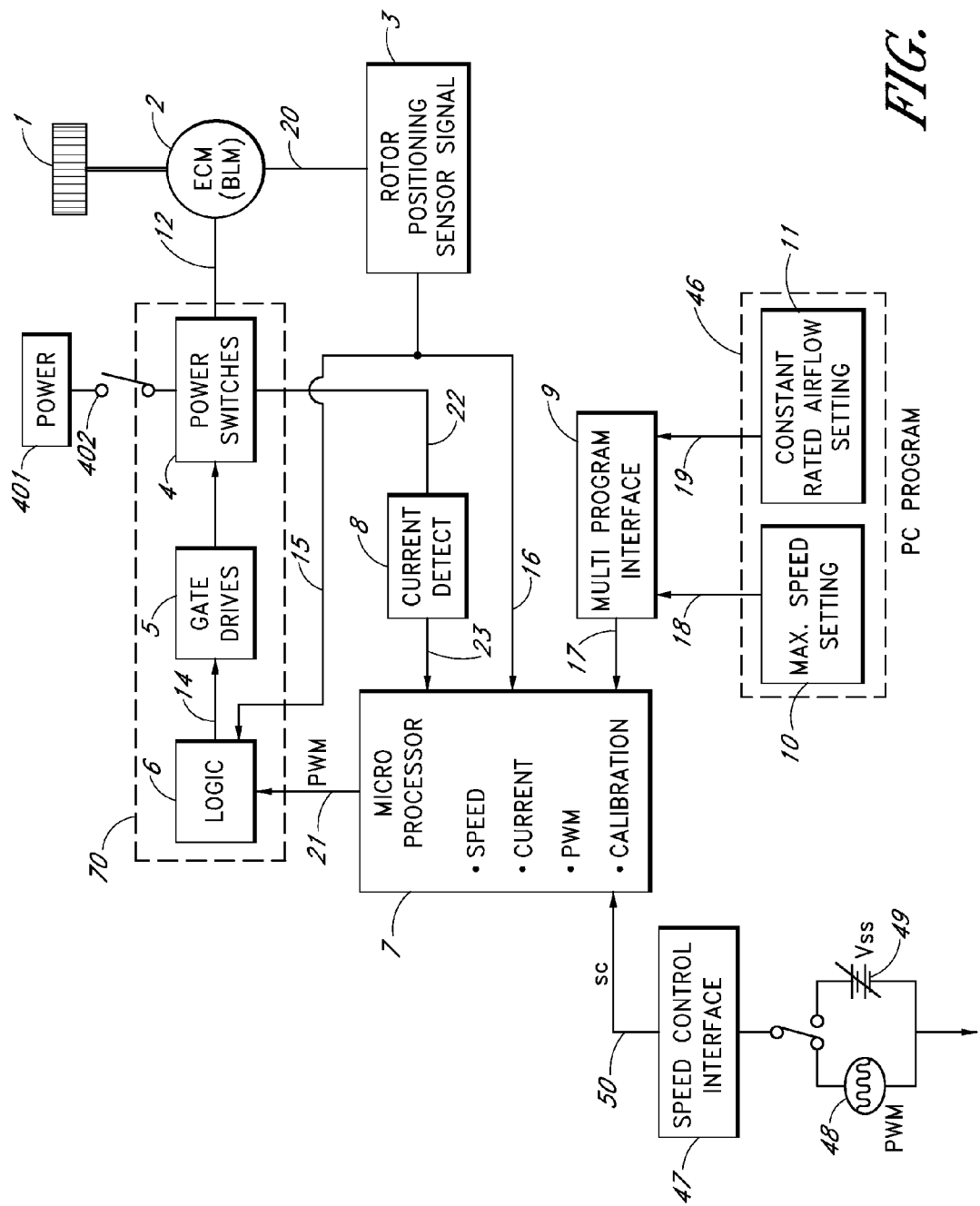
FIG. 14 is a detailed block diagram of a motor controller for a ventilation system according to one embodiment.

In various embodiments, the motor controller can be implemented in various ways including both software and hardware. FIG. 14 illustrates an exemplary controller according to an embodiment of the invention. In the illustrated embodiment, the motor controller includes an electronic control circuit 70. The electronic control circuit 70 includes a power switch circuit 4, a gate circuit or drives 5 and a logic circuit 6. The power switch circuit 4 has an output connected to a motor 2 via a line 12 and supplies a motor coil with switching power, such as a single-phase, two-phase or three-phase for driving a fan 1. The motor 2 can be an electrically commutated motor (ECM) or a brushless motor (BLM) although not limited thereto. The gate circuit 5 is provided for driving the power switch circuit 4, and a logic circuit 6 is provided for controlling a control signal suitable for each motor driving method.

In the illustrated embodiment, the motor controller further includes a current detection circuit 8 for detecting a load current 22 flowing through the motor coil, and a rotor position detection processing circuit 3 for processing a pulse of a position detection signal of a motor rotor. The current detection circuit 8 is connected to an input of a microprocessor 7 via a line 23. The rotor position detection processing circuit 3 is connected to the inputs of the microprocessor 7 and the logic circuit 6 via lines 16 and 15, respectively.

Further, in the illustrated embodiment, the motor controller further includes an input device 46, which has a maximum speed setting unit 10 for use in setting a target RPM corresponding to various airflow rates. Further the input device 46 includes an airflow rate setting unit 11 for setting various levels of constant airflow rates. The maximum speed setting unit 10 and the constant rated airflow setting unit 11 are connected to a multi-program interface circuit 9 via lines 18 and 19, respectively. The multi-program interface circuit 9 has an output connected to the input of the microprocessor 7 via line 17.

The motor controller of the illustrated embodiment further includes an interface circuit 47, a pulse width modulation (PWM) unit 48, and a DC variable voltage unit 49. The interface circuit 47 is configured to process a PWM signal (generally 80 Hz) for speed setting, which is supplied from the external system or control device through the pulse signal supply unit 48, and a variable DC voltage (0 to 10V) supplied from the DC variable voltage unit 49 by using a single terminal. The interface circuit 47 is connected to the input of the microprocessor 7 via line 50.

The microprocessor 7 is configured to process data to control motor so as to operate in a constant airflow rate mode based on the acquired data from the sensor circuits, and transmit a PWM signal (for example, 20 Khz) for speed control. The output signal is transmitted to the logic circuit 6 of the electronic control circuit 70 via a line 21.

In one embodiment, the controller has a set of commands for performing a self-testing operation. In the test operation of the ventilation system, when the motor driving power switch 402 turns on, the motor is operated to rotate the fan from a still state to a preset maximum speed as the microprocessor 7 outputs a PWM output signal while being automatically modulated 0 to 100% according to a self-driving test operation commands of the microprocessor 7. At this time, from the load current 22 and the speed signal 16, the microprocessor 7 acquires current data, speed data, and a peak current rate, which may vary according to various different fan loads and environments, and determines the current-speed relation as shown in FIG. 4.

Figure 15:
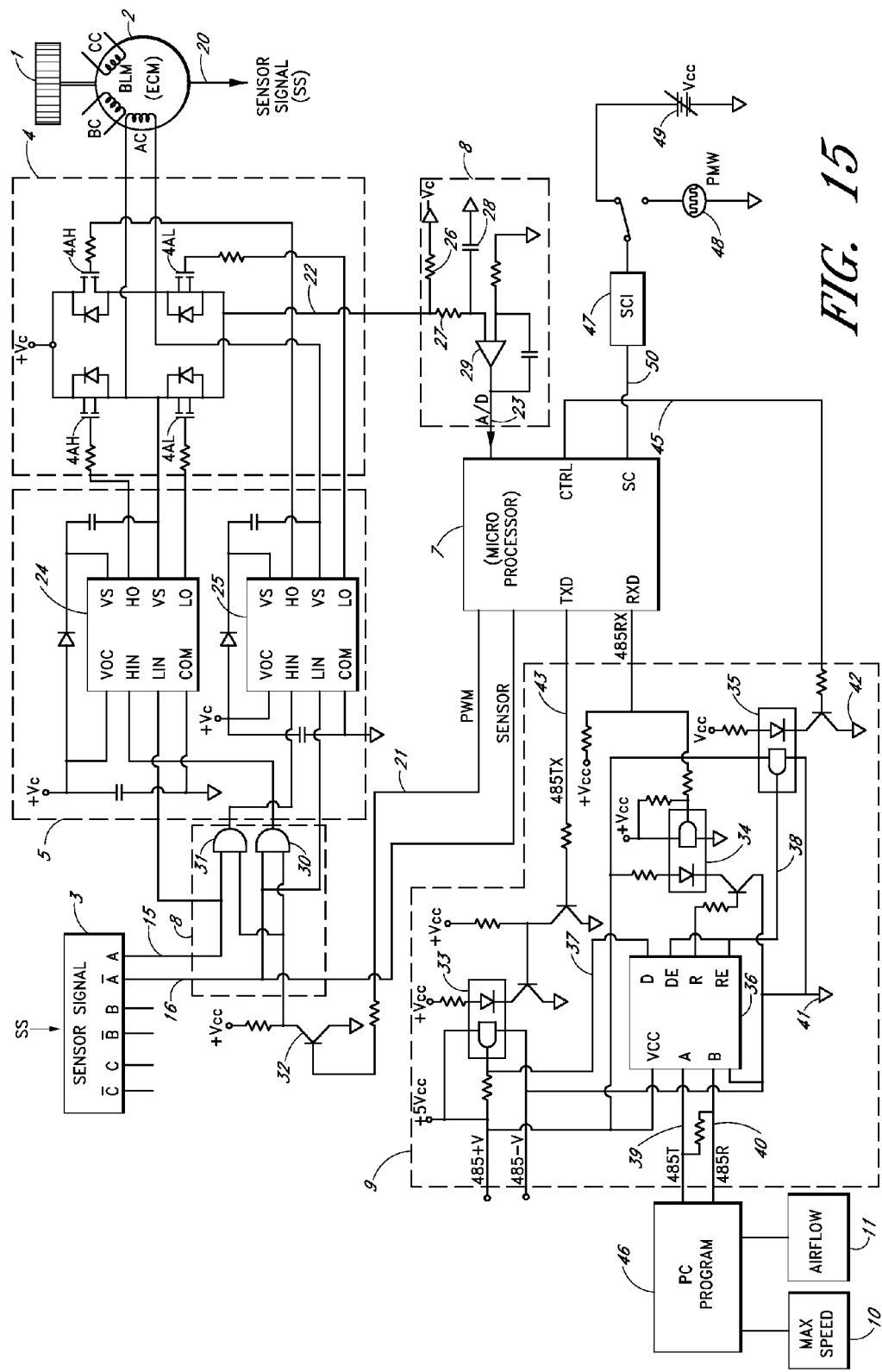
FIG. 15 is a circuit diagram of the motor controller of FIG. 14.

Now referring to FIG. 15, for example, a variety of fans or blower of the fan 1 can be connected to the motor 2 used in a ventilation and air conditioning (HVAC) system. The motor 2 may include an ECM or BLM of a single-phase, two-phase or three-phase or more. The power switch circuit 4 has full bridge FET elements 4AH, 4AL, 4□H, and 4□L, and is connected to one upper winding of the coil of the motor 2.

Each of gate driving circuit sections 24 and 25 of the gate circuit 5 for driving the FET elements of the power switch circuit 4 may include a gate drive-dedicated circuit such as IRS2106. The gate circuit 5 is connected to the power switch circuit 4 and the logic circuit 6 having logic circuit units 30 and 31 for processing the speed signal and the PWM signal.

The power switch circuit 4 is connected to the current detection circuit 8 having a resistor 26 with a resistance of about 0.1 to 0.5Ω, a resistor 27, and a capacitor 28 connected to a motor control circuit ground. A voltage formed in the resistor 26 is integrated when a current flows, and the voltage signal is input to an amplifier 29. The voltage is transmitted to the microprocessor 7 via a line 23. In order to input motor speed (RPM) information from the rotor position detection processing circuit 3 of the motor 2 employing a sensor or back-EMF of an armature coil, the signal is transmitted to the input of the microprocessor 7 via a line 16.

Further, the output of the program input device 46 is connected to a transmission line 39 of a RS485 processor 36. The output signal is to control and monitor a maximum speed setting unit 10 and a constant rated airflow setting unit 11 enabling a multi-level programming for constant airflow control according to one embodiment. A transmission output R of the RS486 processor 36 is connected to a data input RXD of the microprocessor 7 through a photo coupler 34. A data output 43 of the microprocessor 7 is connected to a receiving input of the program input device 46 via the photo coupler 33, the RS485 processor 36 and a line 40. A data communication control (CTRL) signal 45 of the microprocessor 7 is connected to a control terminal of the RS485 processor 36 through the photo coupler 35. Accordingly, the program data can be supplied to the microprocessor 7 smoothly, and grounds 41 and 42 can be electrically insulated from an external program input device 46.

Further, an interface circuit (SCI) 47 has a speed signal conversion microprocessor 56 built therein. The speed signal conversion microprocessor 56 serves to interface a DC variable voltage unit 49 and a pulse width modulator 48 for generating a variable DC voltage of about 0 V to about 10 V and a PWM signal, which is used for speed control or setting, in response to a control signal of an external system controller, to one terminal. Now an embodiment of the speed signal conversion microprocessor 56 is further described.

Figure 16:
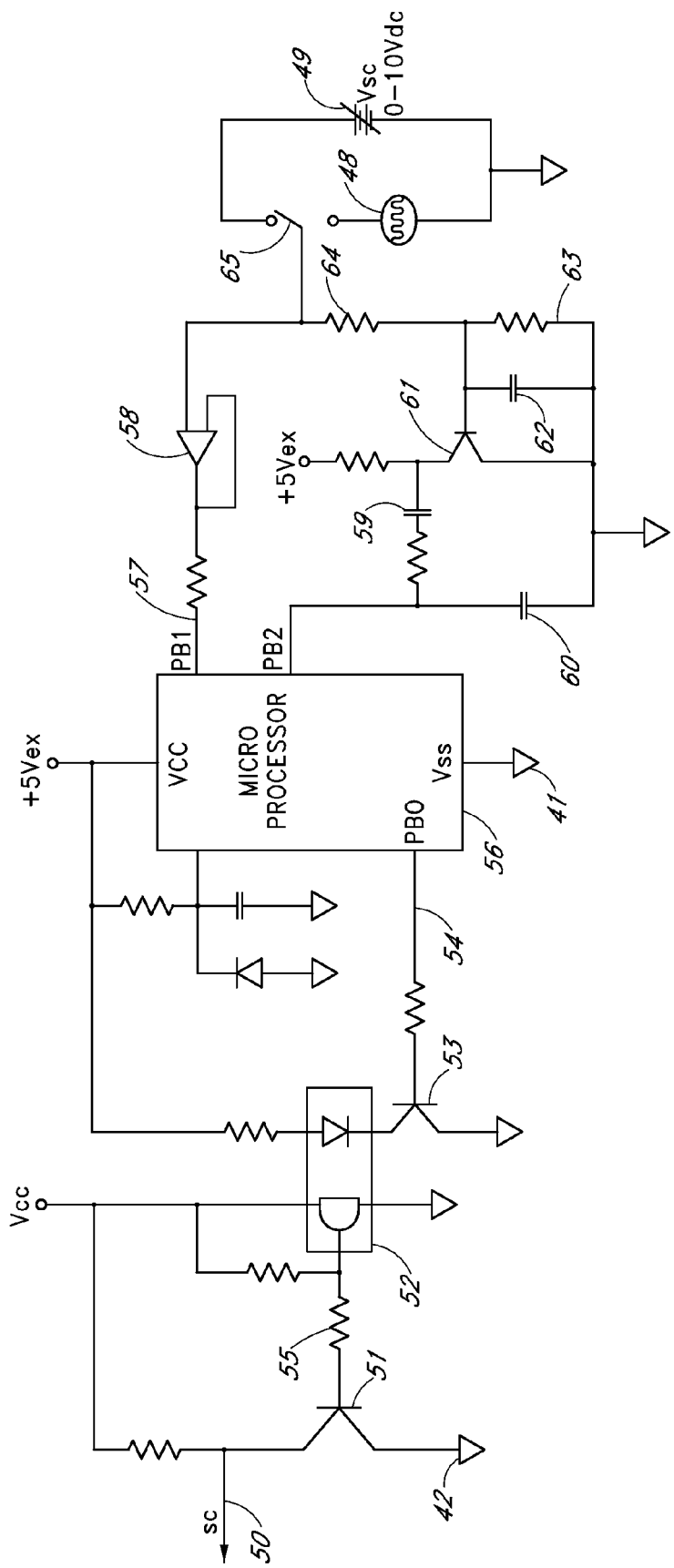
FIG. 16 is a circuit diagram of a speed control interface circuit shown in FIG. 14.

Referring to FIG. 16, in one embodiment, when a DC variable voltage unit 49 is selected by a switch 65, a DC voltage is input to an input PB1 of the speed signal conversion microprocessor 56 through an OP amp 58. The DC voltage passing through a resistor 64 is cut off by a DC filter capacitor 59. Meanwhile, when a predetermined DC voltage is input to the input PB1, the speed signal conversion microprocessor 56 is programmed to output a pulse width modulation signal of 80 Hz (an output signal shown in FIG. 17B), which is proportional to a voltage level thereof. The output signal PBO of 80 Hz is connected (54) to a base of a transistor 53. An output of a photo coupler 52 is connected (55) to a base of a transistor 51. Accordingly, a PWM signal of 80 Hz, which is fully insulated electrically, is output through a collector 50 of the transistor 51.

If a PWM signal of 40 to 120 Hz is connected to the input of the switch 65, a signal whose voltage is divided into the resistor 64 and the resistor 63 is input to a base of a transistor 61. An AC component of a pulse by switching of the transistor 61 is input to an input PB2 of the speed signal conversion microprocessor 56 through the two capacitors 59 and 60.

Figure 17A:
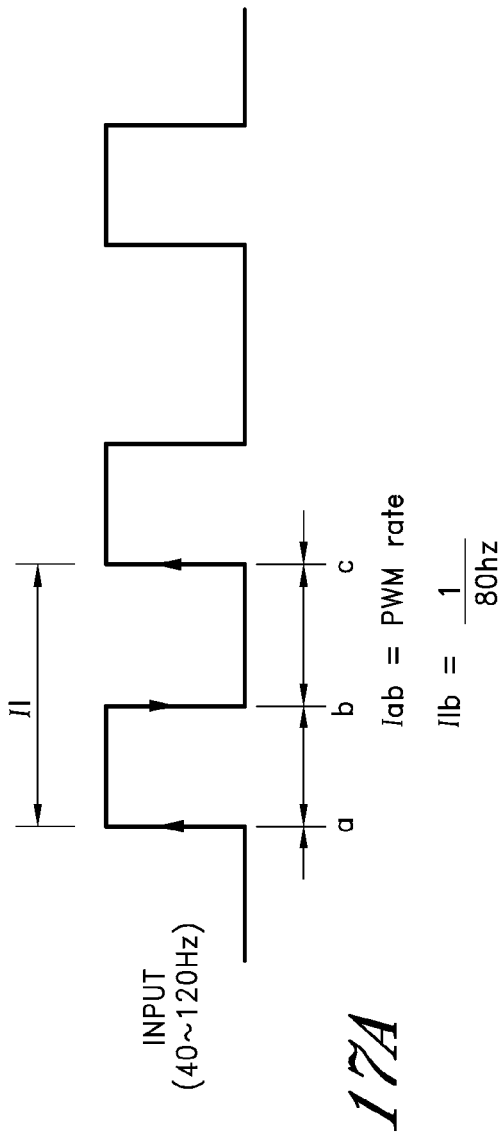
FIGS. 17A and 17B illustrate a PWM input signal and a conversed PWM signal for use in a motor speed control according to one embodiment.
Figure 17B:
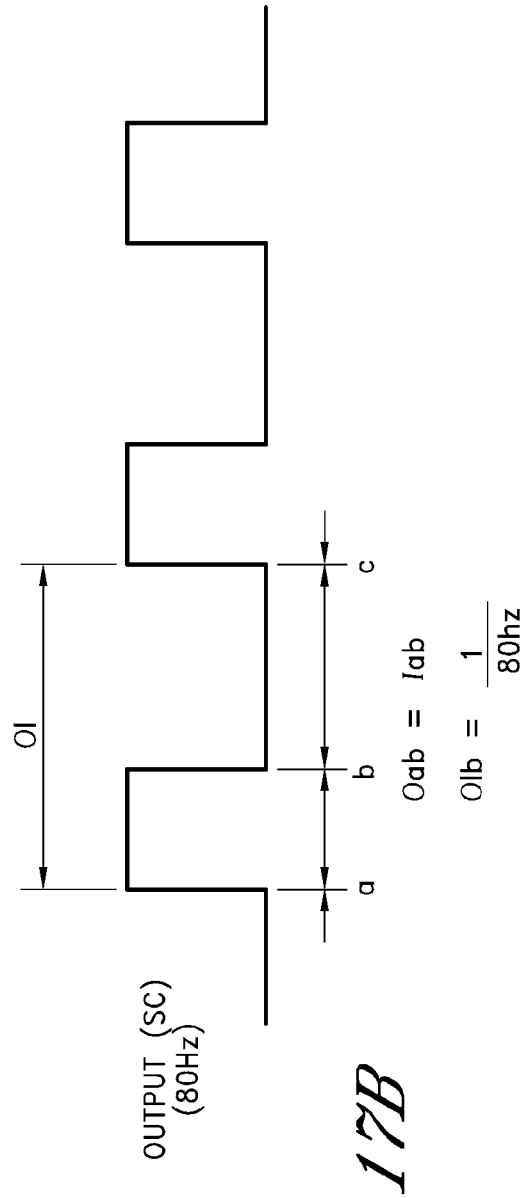

The speed signal conversion microprocessor 56 has a program built therein, for outputting a PWM signal of 80 Hz according to an increase or decrease of a pulse width on the basis of a rising point a of a pulse, a falling point b of the pulse, and a rising point c of 1/f cycle of the pulse, as shown in FIG. 17B, although an input PWM signal frequency is not constant as in INPUT (40 to 120 Hz) of FIG. 17A. Accordingly, a PWM output of 80 Hz can be always output accurately although there is a change in an input PWM frequency.

Embodiments of the present invention provide an input method, which is capable of setting a constant rate point (CRP) and a maximum speed (or target RPM). Thus, as shown in A, B, and C of FIG. 8, various levels of constant airflows can be set and a constant airflow can be realized accurately with a reasonable tolerance and conveniently. According to embodiments of the present invention, although an unknown load is connected to a motor, the motor can be driven according to a self-driving program and a load current and speed of the motor are automatically found to calculate a constant airflow control function. It is thus not necessary to install an additional sensor for detecting static pressure inside the duct nor to input constant airflow data.

Further, embodiments of the present invention provide an input method capable of arbitrarily setting a constant rated point CRP and a maximum speed. Accordingly, constant airflows can be set in various ways such as (A), (B), and (C) of FIG. 8, and an accurate constant airflow can be set conveniently. Further, there is an advantage in that a PWM or DC variable voltage signal for speed control, which is provided from a HAVC system controller, can be processed stably and easily. Furthermore, embodiments of the present invention can simplify a constant airflow control device and system, save a time and cost consumed to calculate and set constant airflow program and data necessary for different fans and blowers, and maximize amenity and energy saving effects, which are expected in HAVC control.

It is to be understood that persons of skill in the appropriate arts may modify the invention here described while still achieving the favorable results of this invention. Accordingly, the foregoing disclosure is to be understood as being a broad, teaching disclosure directed to persons of skill in the appropriate arts, and not as limiting upon the invention.

What is claimed is:

1. A motor control apparatus for a ventilation system, the apparatus comprising: an electric current sensor configured to detect an electric current applied to a motor; a speed sensor configured to detect a rotational speed of the motor; and a controller configured to choose between a first feedback control and a second feedback control such that the first feedback control is chosen when the detected electric current is greater than a reference value and that the second feedback control is chosen when the detected electric current is smaller than a reference value, wherein the first feedback control comprises maintaining a product of the electric current and the rotational speed to stay within proximity of a first target value: wherein the second feedback control comprises maintaining the rotational speed within proximity of a second target value, and wherein the first feedback control and the second feedback control further comprise controlling the motor's operation so as to generate a substantially constant airflow rate from a fan coupled with the motor.

2. The apparatus of claim 1, wherein the controller is further configured to compare the electric current against a reference value, and to transition between the first feedback control and the second feedback control based on the comparison.

3. The apparatus of claim 1, further comprising at least one user input interface configured to receive a user's desired level of airflow rate and to further receive a user's desired level of rotational speed.

4. The apparatus of claim 3, wherein the controller is further configured to use the user's desired level of airflow rate for the first feedback control and to use the user's desired level of rotational speed for the second feedback control.

5. The apparatus of claim 4, wherein at least one of the first feedback control and the second feedback control is designed to achieve a substantially constant airflow rate in different static pressure ranges.

6. The apparatus of claim 1, wherein the controller does not require an input of static pressure for the feedback control.

7. The apparatus of claim 1, wherein the controller does not require an input of the airflow rate generated by the fan for the feedback control.

8. The apparatus of claim 1, wherein the controller is further configured to conduct a test operation to collect a relationship between the electric current and the rotational speed, wherein the controller is further configured to compute a correction coefficient using the collected relationship, wherein the controller is further configured to modify a target value for a feedback control using the correction coefficient.

* * * * *